United States Patent
Eller et al.

(10) Patent No.: US 12,290,981 B2
(45) Date of Patent: May 6, 2025

(54) 3D PRINTING APPARATUS FOR LAYER-BY-LAYER FABRICATION OF OBJECTS USING LAYER TRANSFER PRINTING

(71) Applicant: Wacker Chemie AG, Munich (DE)

(72) Inventors: Klaus Eller, Burghausen (DE); Johannes Neuwirth, Oberndorf (AT)

(73) Assignee: Wacker Chemie AG, Munich (DE)

( * ) Notice: Subject to any disclaimer, the term of this patent is extended or adjusted under 35 U.S.C. 154(b) by 133 days.

(21) Appl. No.: 18/026,622

(22) PCT Filed: Sep. 22, 2020

(86) PCT No.: PCT/EP2020/076421
§ 371 (c)(1),
(2) Date: Mar. 16, 2023

(87) PCT Pub. No.: WO2022/063393
PCT Pub. Date: Mar. 31, 2022

(65) Prior Publication Data
US 2023/0330927 A1    Oct. 19, 2023

(51) Int. Cl.
*B29C 64/141* (2017.01)
*B29C 64/245* (2017.01)
*B29C 64/268* (2017.01)
*B29C 64/357* (2017.01)
*B29C 64/40* (2017.01)
*B33Y 10/00* (2015.01)
*B33Y 30/00* (2015.01)
(Continued)

(52) U.S. Cl.
CPC ......... *B29C 64/141* (2017.08); *B29C 64/245* (2017.08); *B29C 64/268* (2017.08); *B29C 64/357* (2017.08); *B29C 64/40* (2017.08); *B33Y 10/00* (2014.12); *B33Y 30/00* (2014.12); *B33Y 40/00* (2014.12); *B33Y 40/20* (2020.01)

(58) Field of Classification Search
CPC ... B29C 64/141; B29C 64/268; B29C 64/112; B29C 64/357; B29C 64/245; B33Y 10/00; B33Y 30/00; B33Y 40/00
See application file for complete search history.

(56) References Cited

U.S. PATENT DOCUMENTS 10,857,732 B2 * 12/2020 Sandstrom ............ C23C 14/048
11,554,549 B2 * 1/2023 Sandstrom ............ B33Y 30/00
(Continued)

FOREIGN PATENT DOCUMENTS

CN    110666169 A    1/2020
EP    0787766 A1    8/1997
(Continued)

*Primary Examiner* — Edmund H Lee

(57) ABSTRACT

The invention relates to a 3D printing method for the layer-by-layer fabrication of objects using laser transfer printing, and to a 3D printing device for carrying out the method. According to the method, a printing compound (54) applied to a carrier cylinder (51) is irradiated with a laser (50), detached, and transferred to a base plate (27). The resulting printing compound layers are subsequently cured and the process repeated until the object is completely built up. Using said claimed method, objects can be printed from a variety of possible printing materials with high throughput (over 1 kg/h) without affecting the print quality.

17 Claims, 6 Drawing Sheets

(51) Int. Cl.
  B33Y 40/00   (2020.01)
  B33Y 40/20   (2020.01)

(56) References Cited

U.S. PATENT DOCUMENTS

| | | | |
|---|---|---|---|
| 2017/0348872 A1* | 12/2017 | Suzuki | B29C 64/00 |
| 2018/0200948 A1 | 7/2018 | Kuijpers et al. | |
| 2018/0201027 A1* | 7/2018 | Suzuki | B41J 2/442 |
| 2020/0172747 A1 | 6/2020 | Bonderer et al. | |
| 2021/0339469 A1* | 11/2021 | Fujita | B33Y 30/00 |

FOREIGN PATENT DOCUMENTS

| | | | |
|---|---|---|---|
| WO | 1993000405 | A1 | 1/1993 |
| WO | 2006020685 | A2 | 2/2006 |
| WO | 2010015547 | A1 | 2/2010 |
| WO | 2013091003 | A1 | 6/2013 |
| WO | 2015059502 | A1 | 4/2015 |
| WO | 2016030325 | A1 | 3/2016 |
| WO | 2016071241 | A1 | 5/2016 |
| WO | 2017020971 | A1 | 2/2017 |
| WO | 2017081028 | A1 | 5/2017 |
| WO | 2017089496 | A1 | 6/2017 |
| WO | 2017108208 | A1 | 6/2017 |
| WO | 2017121733 | A1 | 7/2017 |
| WO | 2018014948 | A1 | 1/2018 |
| WO | 2018036640 | A1 | 3/2018 |
| WO | 2018072809 | A1 | 4/2018 |
| WO | 2018153467 | A1 | 8/2018 |
| WO | 2018177523 | A1 | 10/2018 |
| WO | 2019063094 | A1 | 4/2019 |
| WO | 2019077812 | A1 | 4/2019 |
| WO | 2020060378 | A1 | 3/2020 |
| WO | 2020152352 | A1 | 7/2020 |
| WO | 2020156632 | A1 | 8/2020 |
| WO | 2020184525 | A1 | 9/2020 |
| WO | WO2020184525 | * | 9/2020 |
| WO | 2021073717 | A1 | 4/2021 |
| WO | 2021209113 | A1 | 10/2021 |

* cited by examiner

3D PRINTING APPARATUS FOR LAYER-BY-LAYER FABRICATION OF OBJECTS USING LAYER TRANSFER PRINTING

CROSS-REFERENCE TO RELATED APPLICATIONS

This application is a U.S. National Phase application of PCT Application NO. PCT/EP2020/076421 filed on Sep. 22, 2020, which is incorporated by reference herein in its entirety.

The invention relates to a novel 3D printing method for layer-by-layer production of objects by laser transfer printing and to a 3D print apparatus for performance of said method. This involves irradiating a print material applied to a carrier cylinder with a laser, detaching it and transferring it to a base plate. The resultant print material layers are subsequently cured, and the operation is repeated until the object has been fully constructed. With the aid of the method of the invention, it is possible to print objects made from a multitude of possible print materials with high throughput (above 1 kg/h) without impairment of print quality.

PRIOR ART 3D printing involves building three-dimensional objects layer by layer. They are built under computer control from one or more liquid or solid materials according to defined geometries from CAD (Computer Aided Design). In the building process, physical or chemical curing or solidification processes take place. Typical materials for 3D printing are plastics, synthetic resins, ceramic and metals. 3D printers are used in industry, research and also in the consumer sector. 3D printing is a method of additive manufacturing.

3D printers serve firstly, in particular, for production of prototypes and models, and for production of objects where only a few examples are required. Of growing significance are individualized geometries in medicine and sport, but also objects that are not producible at all by other methods. One example is objects with internal grid structures.

3D printing has the advantage over the method of injection molding that there is no need for complex production of molds and forms. 3D printing has the advantage over all material-removing methods, such as processing by material removal (e.g. turning, drilling, grinding, milling), that there is no need to process the blank and there is barely any loss of material.

Additive manufacturing methods (3D printing) include numerous techniques which share the feature of automated additive building of layers of the shaped article (A. Gebhardt, Generative Fertigungsverfahren [Additive Manufacturing Methods], Carl Hanser Verlag, Munich 2013).

A prerequisite for all additive manufacturing methods is the creation of the geometry and any further properties (for example color, material composition) of the desired shaped article in the form of a digital 3D dataset, which can be regarded as a virtual model of the shaped article. This modelling is preferably effected by means of various 3D-CAD construction methods (computer-aided design). Input data used for the creation of a 3D-CAD model may also be 3D measurement data as result, for example, from CT measurements (computer tomography) or MRT measurements (magnetic resonance tomography). The 3D-CAD dataset subsequently has to be supplemented by material-, method- and system-specific data, which is effected in that this is transferred to additive manufacturing software via an interface in a suitable format (e.g. STL, CLI/SLC, PLY, VRML, AMF format). This software uses the geometric information ultimately to produce virtual slices, taking account of the optimal orientation of the component in the built space, support structures etc. The complete dataset ultimately permits the direct addressing of the machine used for the additive manufacture (3D printer).

The software procedure is, for example, as follows:
1. Construction of the component in CAD format
2. Export to STL data format
3. Division of the 3D model into slices parallel to the printing plane and generation of the GCode
4. Transmission of the GCode to the print controller Additive manufacturing methods are available for numerous materials and combinations thereof (e.g. metals, plastics, ceramics, glasses). For example, for the additive manufacturing of objects, there already exist multiple established methods such as fused deposition modeling (FDM) for plastics and specific synthetic resins
stereolithography for liquid synthetic resins
laser sintering for metals, polymers and ceramic
electron beam melting for metals Likewise known are methods in which print material is deposited by droplet dosage (called jetting) or continuous extrusion of a strand (in what is called the dispensing or extrusion method), followed, for example, by curing by the action of UV radiation or consolidation in some other way.

Standard 3D printing methods are described, for example, in WO2006020685 A2, WO2013091003 A1, WO2015059502 A1 and WO2016071241 A1

None of the known 3D printing methods to date are suitable for production of precision objects with high throughput. Particular disadvantages are low throughputs of the individual technologies (well below 1 kg/h) and restrictions with regard to the possible print materials, especially to the chemical and physical properties thereof (for example restrictions with regard to type, viscosity, filler content, solvent content).

There is no known sufficiently precise 3D printing method to date that enables the production of objects with a throughput of greater than 1 kg/h and is simultaneously suitable for a multitude of print materials (object-forming materials or support materials).

CN110666169 A discloses a 3D print apparatus which, in batchwise operation, produces 3D objects via a laser transfer method. This involves applying metals as 3D print material to individual carriers in a separate process by magnetron sputtering and clamping them manually in a laser and movement apparatus. Continuous printing is impossible here.

It was therefore an object of the present invention to provide an additive 3D printing method that leads to a high-quality print with minimum printing times, combined with high throughputs. A particular intention was to ensure that the print materials are positioned at the intended target position without trajectory errors. At the same time, the method is to be suitable for a multitude of different print materials.

This object is surprisingly achieved by the method of the invention and the apparatus of the invention. The present invention enables the printing of objects with a high throughput of greater than 1 kg/h without impairing the print quality of the objects.

FIGURES

DESCRIPTION OF THE INVENTION

Figure 1:
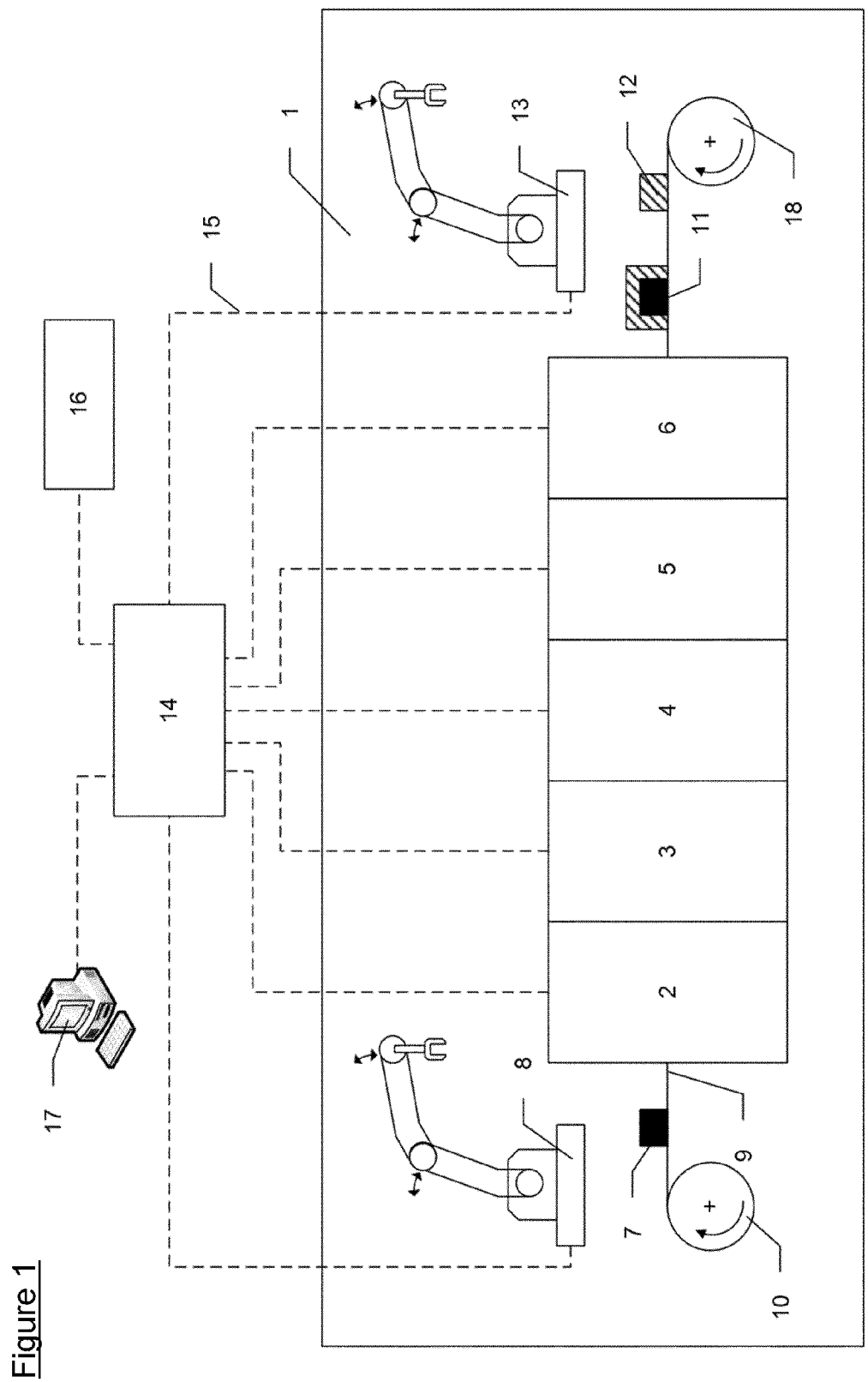
FIG. 1 shows a process diagram of a composite production plant system for production of 3D-printed articles.

The invention relates to a method of layer-by-layer production of objects by laser transfer printing in a 3D print apparatus comprising at least one plate (28), at least one laser source (50), and at least one carrier cylinder (51); wherein the material of the carrier cylinder (51) is transparent to the laser beams (50a) from the laser source (50), wherein the method comprises the following steps:
(a) coating at least part of the outer surface of the carrier cylinder (51) with at least one print material (54);
(b) irradiating the carrier cylinder (51) with laser beams (50a) from the laser source (50), such that at least a portion of the applied print material (54) is detached from the carrier cylinder (51) and transferred to the plate (28), to an extrinsic component (7) positioned thereon or to a previously applied print material layer; where the irradiation is effected in such a way that the laser beams (50a)
  (i) hit the print material (54) directly through the carrier cylinder (51) from outside the carrier cylinder (51), or
  (ii) hit the print material (54) via one or more mirrors from within the carrier cylinder (51),
(c) forming a print material layer by curing the print material (54) transferred in step (b),
(d) repeating steps (a) to (c) until the object has been fully constructed.

The present invention additionally relates to a 3D print apparatus for production of objects by laser transfer printing, comprising
at least one laser source (50);
at least one carrier cylinder (51), where the material of the carrier cylinder (51) is transparent to the laser beams (50a) from the laser source (50),
at least one application system (52) set up to coat at least part of the outer surface of the carrier cylinder (51) with at least one print material (54);
at least one plate (28),
wherein the laser source (50) is set up to irradiate the carrier cylinder (51) such that at least a portion of the print material (54) applied to the carrier cylinder (51) is detached and transferred to the plate (28), to an extrinsic component (7) positioned thereon or to a previously applied print material layer, wherein the 3D print apparatus is set up such that the laser beams (50a)
(i) hit the print material (54) directly through the carrier cylinder (51) from outside the carrier cylinder (51), or
(ii) hit the print material (54) via one or more mirrors from within the carrier cylinder (51).

Since the method of the invention for layer-by-layer production of objects is preferably produced by the 3D print apparatus of the invention, the description that follows should be understood such that features described in the context of the method are disclosed equally for the 3D print apparatus and, conversely, features described in the context of the 3D print apparatus are disclosed equally for the method.

Standard laser transfer printing processes (LIFT=laser induced forward transfer) are adequately described in the literature and form part of the prior art. A specific application is described, for example, in WO2020156632 A1.

The plate (28) is preferably disposed beneath the carrier cylinder (51).

In one embodiment, the print module (20) comprising the carrier cylinder (51) remains fixed during the printing operation, while the plate (28) is configured to be mobile. However, this arrangement is less preferred owing to the lower stability and dynamic influences on the print bodies. The carrier cylinder itself remains rotatable in this arrangement, even though the print module as a whole remains fixed.

Figure 5:
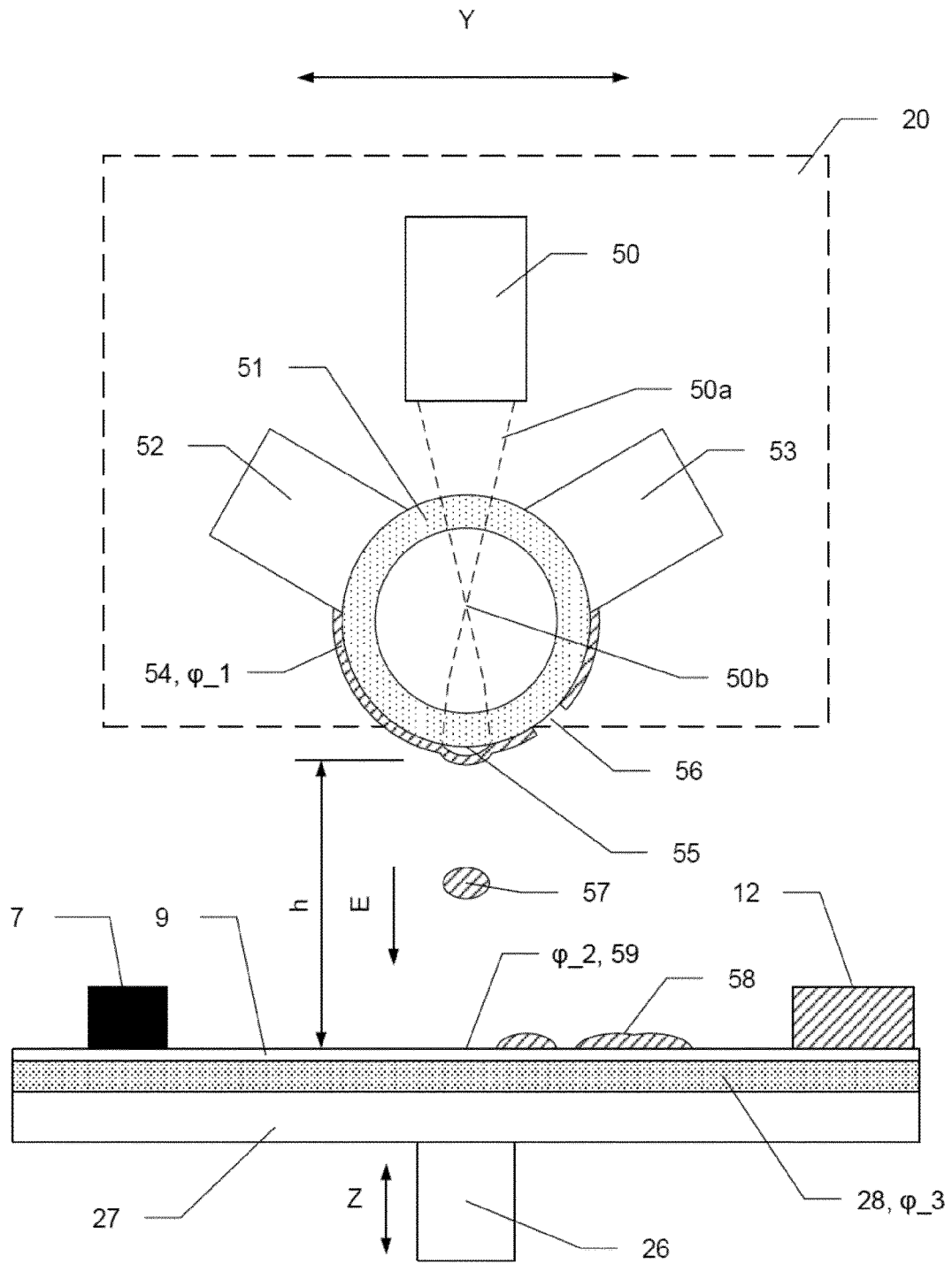
FIG. 5 shows a diagram of a LIFT-3D print module with detachment operation and positioning of print material.

The exact local positioning of the print materials is preferably undertaken by movement of the plate (28) in Z direction (corresponding to the up/down axis in FIG. 5) and in Y direction (corresponding to the left/right axis in FIG. 5), and deflection by the laser source (50) in X direction (corresponding to the backward/forward axis in FIG. 5).

In an alternative embodiment, the plate (28) remains fixed, while the print module is configured to be mobile.

The exact local positioning of the print materials is preferably undertaken movement of the print module (20) in Z direction and in Y direction, and deflection by the laser source (50) in X direction.

In a particularly preferred embodiment, the print module (20) comprising the carrier cylinder (51) and also the plate (28) are configured to be movable in one or more directions (X, Y and/or Z).

The exact local positioning of the print materials is preferably undertaken via movement of the plate (28) in Z direction and movement of the print module (20) in Y direction, and deflection by the laser source (50) in X direction. This arrangement is the easiest to implement in technical terms and is therefore preferred over the other arrangements.

In addition, mixed variants of the arrangements described are also possible, in which one or more components are configured to be movable in one or more directions (X, Y and/or Z) and one or more components are optionally configured to be fixed.

The positional data are communicated to the positioning and deflecting system via the overall controller (14).

The laser source is preferably disposed above the carrier cylinder (51), such that the laser beams (50a) can be directed directly through both walls of the carrier cylinder (51) onto the print material applied to the lower side of the carrier cylinder.

Alternatively, the laser source (50) may also be in any position (inside or extrinsic) with respect to the carrier cylinder. In this case, laser beams are preferably directed onto the print material applied to the carrier cylinder through just one wall by means of one or more mirrors within the carrier cylinder.

The mirrors may be configured to be movable or rigid, preferably movable. Movable mirrors have the advantage that they can direct the laser beams variably onto particular regions of the print material. In a particular embodiment, there is at least one movable mirror within the carrier cylinder.

The carrier cylinder (51) preferably has an external diameter in the range from 50 mm to 300 mm, more preferably in the range of 70 mm to 150 mm, especially preferably in the range of 80 mm to 120 mm.

The carrier cylinder (51) may be of compact or hollow configuration. The carrier cylinder (51) is preferably of hollow configuration. In that case, the carrier cylinder (51)

preferably has a wall thickness in the range from 1 mm to 20 mm, more preferably in the range from 3 mm to 15 mm, especially preferably in the range from 6 mm to 12 mm.

The carrier cylinder (51) preferably has a length in the range from 20 mm to 600 mm, more preferably from 100 mm to 400 mm, especially preferably from 150 mm to 300 mm.

The tolerance range for variances in the geometric dimensions of the carrier cylinder (51) is preferably in the region of below 500 µm, more preferably below 100 µm, especially preferably below 10 µm.

The surface roughness (Ra) of the carrier cylinder (51) is preferably below 10 µm, more preferably below 100 nm, measured by confocal laser scanning microscope (e.g. VK-X1000 from Keyence).

The surfaces are preferably polished and may optionally be equipped with antireflection coatings.

The print material layer (54) applied to the carrier cylinder (51) preferably has a layer thickness of 1 µm to 1000 µm, more preferably of 10 µm to 500 µm, especially preferably of 50 µm to 150 µm.

The distance h (cf. FIG. 5) between coated carrier cylinder (51) and plate (28) is preferably within a range from 20 µm to 600 µm, more preferably from 80 µm to 400 µm, especially preferably from 100 µm to 200 µm.

In many executions of the known LIFT method, reference is made to the focusing of the laser beam onto the interface of print material and carrier system. In the execution with silicone compositions, the position of the laser focal point (50b) within the carrier cylinder and above the interface between print material and carrier cylinder results in a better printed image. The focal point here is in the range from a few micrometers to a few millimeters above the carrier cylinder/print material interface. Focusing of the laser beam onto, within or beneath the interface at first results in detachment, but this subsequently leads to considerable post-heating on the target surface and possibly to burning or thermal degradation of the print material (58) applied.

The focal point of the laser beams is preferably chosen such that it is within the carrier cylinder within a range from 0.01 mm to 10 mm, preferably from 0.1 mm to 5 mm, especially preferably from 1 mm to 3 mm, above the interface between print material and carrier cylinder.

Standard laser sources are, for example, Nd:YAG lasers (neodymium-doped yttrium aluminum garnet lasers) and emit laser radiation in the NIR (near infrared) region. These wavelengths are used in most laser systems for coupling into opaque media. An advantage here is the use of carrier materials such as glass and quartz glass for the carrier cylinder. A disadvantage here is the need for additions of absorber, for example carbon black, graphite, CNTs, in transparent silicone elastomers. Electrically nonconductive absorbers are commercially available, for example, from FEW Chemicals GmbH, Germany.

In a particular execution, irradiation with a laser is effected in the MIR (mid-infrared region). Suitable laser sources here are within a wavelength range of 8-12 µm, preferably 10.6 µm ($CO_2$ lasers). In this specific configuration, transparent silicone elastomers and variable support materials may be used without additions of absorbers. In technical terms, however, the carrier cylinder should be executed so as to be optically transparent to the corresponding wavelengths. Preference is given here to using ZnSe glass (zinc selenide) at a wavelength of 10.6 µm. Particular preference is given here to using antireflection coatings at the interfaces. These are available, for example, from LASER COMPONENTS GmbH, Germany.

The material for the carrier cylinder is preferably selected from the group consisting of glass, quartz glass, polyethyleneterephthalate, polycarbonate, polyimide, polymethylmethacrylate (PMMA), ZnSe, ZnS, $BaF_2$, $CaF_2$, Ge, KBr, NaCl, $MgF_2$, LiF and Si.

However, particular preference is given here to the use of silicon as material for the carrier cylinder. Especially preferred is the use of ultrapure silicon in monocrystalline form, preferably with defined lattice alignment. Especially preferred is silicon produced by zone melting methods (float zone methods) with a specific resistivity greater than 1000 ohm*cm. Such ultrapure silicon is available, for example, from Wacker Chemie AG, Germany. Monocrystalline silicon is available, for example, from Siltronic AG, Germany.

The mode of curing should be chosen depending on the print material. Curing is preferably effected by supply of heat, electromagnetic radiation and/or moisture. Particular preference is given to curing by electromagnetic radiation, for example IR, UV and/or UV-VIS radiation, especially when silicone compositions are used. In the case of thermoplastics as print material, curing by cooling is also possible.

The 3D print apparatus preferably comprises at least one curing module set up to cure the print material.

The print material can also be cured via the laser beam of the laser source.

It is also possible to choose different curing strategies, for example initial partial curing of print material, in order to be able to undertake later modification.

The individual print materials may also be cured by different methods.

In a further embodiment, the print body is mechanically stretched or compressed after printing, while the curing of the as yet uncured print materials is undertaken.

Before and/or in the course of curing, an electrical voltage may additionally be applied to the component, in which case electrical contacting is effected via regions of uncured print materials and curing is performed after application thereof.

Methods and examples of modification by fields and mechanical deformation are known to the person skilled in the art from the production of ferroelectric polyvinylidenefluoride (PDF) films.

Curing can also be effected with high-energy radiation, for example electron beams or cobalt-60 radiation. A multitude of methods of electron beam curing is known in the prior art.

In a preferred embodiment, a continuous belt (9) is in a movable arrangement on the plate. In step (b), the print material is then transferred to the continuous belt (9), to an extrinsic component (7) positioned thereon or to a print material layer (58) applied beforehand. The continuous belt (9) enables introduction and discharge to the different modules of the 3D print apparatus (e.g. print module, curing module, inspection unit, etc.).

The 3D print apparatus preferably comprises at least one belt feeder (10) and a belt storage means (18) for the continuous belt (9).

In a further embodiment, the 3D print apparatus comprises at least one pick-and-place unit (8) and/or removal unit (13), which are set up to position extrinsic components (7) and/or the printed object (12) onto the plate (28) or onto the continuous belt (9) and/or to remove them from the plate (28) or from the continuous belt (9).

As an alternative to the continuous method by means of a continuous belt, the method may also be conducted batchwise. This involves manually positioning or removing the parts to printing and those that have been printed.

Especially when employed with silicone compositions, the extension with defined charging and additional application of electrostatic fields has been found to be advantageous (EF LIFT=electric field laser-induced forward transfer). What is achieved here is an improvement in detachment and positioning with additional charging of the print material and of the target surface. The use of EF LIFT is described, for example, in WO2020156632 A1.

Particular preference is therefore given, prior to step (b), to charging the print material applied to the carrier cylinder to a potential phi_1, and charging the plate to a potential phi_3, where phi_1 and phi_3 have opposite polarities. The symbol φ is used rather than phi hereinafter.

In a further embodiment, the surface of the extrinsic component, of the previously applied print material layer and/or of any continuous belt is additionally charged to a potential phi_2, where phi_2 and phi_1 have opposite polarities and phi_2 is chosen such that at least a portion of the charge on the print material transferred in step (b) is neutralized on the surface to be printed.

The plate is preferably a movable vacuum plate that fixes the continuous belt at a particular distance from the coated carrier cylinder in step (b).

The surface of the plate, of the continuous belt, of the extrinsic component and/or of the previously applied print material layer that is to be printed are preferably electrostatically discharged by a preliminary discharge module before step (b) and, if appropriate, before charging to potential phi_2 or phi_3.

The 3D print apparatus therefore preferably comprises at least one charging/discharging module set up to charge the print material applied to the carrier cylinder, the surface of the plate and/or the target surface to be printed (for example the continuous belt) each independently to a particular potential phi.

The term "charging" in the context of the present invention is understood to mean increasing or lowering the potential. This also includes charging or discharging to a potential of 0 V.

Corresponding ionization systems, especially for silicone compositions, are described, for example, in WO2018072809 A1.

The carrier cylinder preferably rotates, with application by an application system of a layer comprising print material to the rotating carrier cylinder in step (a) and removal of print material that has not been detached from the rotating carrier cylinder by a removal system in step (b).

The 3D print apparatus preferably comprises at least one removal system set up to remove print material that has not been detached from the carrier cylinder (51).

Application and removal systems for rollers are known to the person skilled in the art from the fields of offset printing and intaglio printing. Such systems are commercially available, for example, from Heidelberger Druckmaschinen AG, Germany.

In an alternative embodiment, the carrier cylinder is coated manually, but preference is given to automated coating.

In a particular embodiment of the 3D print apparatus, the carrier cylinder (51), the application system (52), the removal system (53) and/or the built space of the 3D print apparatus are configured to be heatable and/or coolable.

Preferably, the print material removed by the removal system (53) is reused for coating of the carrier cylinder in step (a).

Preferably, the print material removed by the removal system (53) is processed by at least one processing unit (64) before reuse, where the processing operation comprises one or more of the following steps: comminution, filtering, degassing, moistening, demoistening, addition of additives, and measurement of the physical and/or chemical properties of the print material.

The 3D print apparatus therefore preferably comprises at least one processing unit (64) set up to process the print material (54) removed by the removal system (53) for reuse.

If the print material comprises two or more components, each component is preferably supplied from a metering unit (61, 62) to one or more mixing systems (63, 57) before step (a).

Print material (54) removed by the removal system (53) is preferably mixed into the mixing system (63, 67).

The type and composition of the print material are not subject to any particular restrictions.

The print material preferably contains less than 5% by weight, more preferably less than 1% by weight, especially preferably less than 0.5% by weight, most preferably less than 0.1% by weight, of solvent, based on the total mass of the print material.

Suitable solvents are known in the prior art and are commercially available. The solvent should be chosen depending on the chemical composition of the print material. The solvent may, for example, be water or an aqueous solution. Alternatively, the solvent may, for example, be an organic solvent. Preference is given to an organic solvent having 3 to 20 carbon atoms. Examples of solvents include aliphatic hydrocarbons, for example nonane, decalin and dodecane; aromatic hydrocarbons, for example mesitylene, xylene and toluene; esters, for example ethyl acetate and butyrolactone; ethers, for example n-butyl ether and polyethylene glycol monomethyl ester; ketones, for example methyl isobutyl ketone and methyl pentyl ketone; and combinations of the aforementioned solvents.

Suitable print materials are, for example, one or more of the following object-forming materials: silicones, polyacrylates, polyolefins, polyurethanes, polyureas, polynitriles, polyesters, polyethers, polylactides, polyhydroxyalkanoates, and mixtures, solutions, dispersions or copolymers comprising one or more of the aforementioned object-forming materials. Preference is given to using silicone compositions.

Particular preference is given to selecting at least one print material from the group consisting of crosslinkable silicone elastomer compositions, silicone gels, silicone resins, silicone oils and silicone dispersions.

In addition, it is possible to use one or more support materials as print material, which are removed again after the object has been constructed.

Object-forming print materials used may in principle be any of the silicone compositions known in the prior art. The silicone composition is preferably chosen such that the crosslinking thereof is not triggered merely by irradiation with the laser used in laser transfer printing.

It is possible, for example, to use addition-crosslinking, peroxidically crosslinking, condensation-crosslinking or radiation-crosslinking silicone elastomer compositions. Preference is given to peroxidically crosslinking or addition-crosslinking compositions. Particular preference is given to addition-crosslinking compositions.

The silicone elastomer compositions may be formulated in one- or two-component form. The silicone elastomer compositions are crosslinked by supply of heat, UV light and/or moisture. Suitable examples include the following silicone elastomer compositions: HTV (addition-crosslinking), HTV (radiation-crosslinking), LSR, RTV 2 (addition-crosslinking), RTV 2 (condensation-crosslinking), RTV 1, TPSE (thermoplastic silicone elastomer), thiol-ene and cyanoacetamide-crosslinking systems.

The addition-crosslinking silicone compositions in the simplest case contain
(A) at least one linear compound having radicals with aliphatic carbon-carbon multiple bonds,
(B) at least one linear organopolysiloxane compound having Si-bonded hydrogen atoms, or, instead of (A) and (B) or in addition to (A) and (B),
(C) at least one linear organopolysiloxane compound having Si—C-bonded radicals with aliphatic carbon-carbon multiple bonds and Si-bonded hydrogen atoms, and
(D) at least one hydrosilylation catalyst.

In a particular embodiment, the silicone compositions are silicone elastomer compositions having fluorinated side groups, as described, for example, in WO2018177523 A1. In this embodiment, component (A), (B) and/or (C) preferably contain at least 2.5 mol %, more preferably at least 5 mol %, of fluorinated side groups, for example 3,3,3-trifluoropropylmethylsiloxy and/or bis(3,3,3-trifluoropropyl)siloxy groups.

The silicone compositions may be one-component silicone compositions or else two-component silicone compositions. In the latter case, the two components of the compositions may contain any constituents in any combination, generally with the proviso that one component does not simultaneously contain siloxanes with an aliphatic multiple bond, siloxanes with Si-bonded hydrogen and catalyst, i.e. essentially does not simultaneously contain constituents (A), (B) and (D) or (C) and (D).

As is well known, compounds (A) and (B) or (C) that are used in the compositions are chosen such that crosslinking is possible. For example, compound (A) has at least two aliphatically unsaturated radicals and (B) has at least three Si-bonded hydrogen atoms, or compound (A) has at least three aliphatically unsaturated radicals and siloxane (B) has at least two Si-bonded hydrogen atoms, or, instead of compounds (A) and (B), siloxane (C) is used, which has aliphatically unsaturated radicals and Si-bonded hydrogen atoms in the abovementioned ratios. Also are mixtures of (A) and (B) and (C) with the abovementioned ratios of aliphatically unsaturated radicals and Si-bonded hydrogen atoms.

The compound (A) used can be silicon-free organic compounds having preferably at least two aliphatically unsaturated groups, and organosilicon compounds having preferably at least two aliphatically unsaturated groups, or else mixtures thereof.

Examples of silicon-free organic compounds (A) are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylen-4,7,8,9-tetrahydroindene, methylcyclopentadiene, 5-vinyl-2-norbornene, bicyclo[2.2.1]hepta-2,5-diene, 1,3-diisopropenylbenzene, polybutadiene containing vinyl groups, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methyl-1,5-heptadiene, 3-phenyl-1,5-hexadiene, 3-vinyl-1,5-hexadiene and 4,5-dimethyl-4,5-diethyl-1,7-octadiene, N,N'-methylenebisacrylamide, 1,1,1-tris(hydroxymethyl)-propane triacrylate, 1,1,1-tris(hydroxymethyl)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5-triazine, triallyl-s-triazine-2,4,6(1H,3H,5H)-trione, diallyl malonate, polyethylene glycol diacrylate, polyethylene glycol dimethacrylate, poly(propylene glycol) methacrylate.

The silicone compositions preferably contain, as constituent (A), at least one aliphatically unsaturated organosilicon compounds, where any of the aliphatically unsaturated organosilicon compounds used to date in addition-crosslinking compounds may be used, for example silicone block copolymers with urea segments, silicone block copolymers with amide segments and/or imide segments and/or ester-amide segments and/or polystyrene segments and/or silarylene segments and/or carborane segments and silicone graft copolymers with ether groups.

Organosilicon compounds (A) used that have Si—C-bonded radicals with aliphatic carbon-carbon multiple bonds are preferably linear or branched organopolysiloxanes formed from units of the general formula (I)

$$R^4_a R^5_b SiO_{(4-a-b)/2} \qquad (I)$$

where
$R^4$ is the same or different and is independently an organic or inorganic radical which is free of aliphatic carbon-carbon multiple bonds,
$R^5$ is the same or different and is independently a monovalent substituted or unsubstituted Si—C-bonded hydrocarbyl radical having at least one aliphatic carbon-carbon multiple bond,
a=0, 1, 2 or 3, and
b=0, 1 or 2,
with the proviso that the sum of a+b is less than or equal to 3 and there are at least 2 $R^5$ radicals per molecule.

$R^4$ radical may be a mono- or polyvalent radical, where the polyvalent radicals, for example bivalent, trivalent and tetravalent radicals, may then connect multiple, for instance two, three or four, siloxy units of the formula (I) to one another.

Further examples of $R^4$ are the monovalent radicals —F, —Cl, —Br, —OR$^6$, —CN, —SCN, —NCO, and SiC-bonded substituted or unsubstituted hydrocarbyl radicals which may be interrupted by oxygen atoms or the —C(O)— group, and divalent radicals Si-bonded at either end as per formula (I). If $R^4$ radical comprises SiC-bonded substituted hydrocarbyl radicals, preferred substituents are halogen atoms, phosphorus-containing radicals, cyano radicals, —OR$^6$, —NR$^6$—, —NR$^6_2$, —NR$^6$—C(O)—NR$^6_2$, —C(O)—NR$^6_2$, —C(O)R$^6$, —C(O)OR$^6$, —SO$_2$-Ph and —C$_6$F$_5$. $R^6$ here is independently the same or different and is a hydrogen atom or a monovalent hydrocarbyl radical having 1 to 20 carbon atoms and Ph is the phenyl radical.

Examples of $R^4$ radicals are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycloheptyl and methylcyclohexyl radicals, aryl radicals, such as the phenyl, naphthyl, anthryl and phenanthryl radical, alkaryl radicals, such as o-, m-, p-tolyl radicals, xylyl radicals and ethylphenyl radicals, and aralkyl radicals, such as the benzyl radical, the α- and the β-phenylethyl radical.

Examples of substituted $R^4$ radicals are haloalkyl radicals, such as the 3,3,3-trifluoro-n-propyl radical, the 2,2,2,2',2', 2'-hexafluoroisopropyl radical, the heptafluoroisopropyl radical, haloaryl radicals, such as the o-, m- and p-chlorophenyl radical, —(CH$_2$)—N(R$^6$)C(O)NR$^6{}_2$, —(CH$_2$)$_n$—C(O)NR$^6{}_2$, —(CH$_2$)$_o$—C(O)R$^6$, —(CH$_2$)$_o$—C(O)OR$^6$, —(CH$_2$)$_o$—C(O)NR$^6{}_2$, —(CH$_2$)$_o$—C(O)—(CH$_2$)$_p$C(O)CH$_3$, —(CH$_2$)$_o$—O—CO—R$^6$, —(CH$_2$)—NR$^6$—(CH$_2$)$_p$—NR$^6{}_2$, —(CH$_2$)$_o$—O—(CH$_2$)$_p$CH(OH) CH$_2$OH, —(CH$_2$)$_o$(OCH$_2$CH$_2$)$_p$OR$^6$, —(CH$_2$)$_o$—SO$_2$-Ph and —(CH$_2$)$_o$—O—C$_6$F$_5$, where R$^6$ and Ph conforms to the definition given above and o and p are identical or different integers from 0 to 10.

Examples of R$^4$ as divalent radicals Si-bonded at either end as per formula (I) are those that derive from the monovalent examples given above for R$^4$ radical in that there is an additional bond through substitution of a hydrogen atom; examples of such radicals are —(CH$_2$)—, —CH(CH$_3$)—, —C(CH$_3$)$_2$—, —CH(CH$_3$)—CH$_2$—, —C$_6$H$_4$—, —CH(Ph)—CH$_2$—, —C(CF$_3$)$_2$—, —(CH$_2$)$_o$—C$_6$H$_4$—(CH$_2$)$_o$—, —(CH$_2$)$_o$—C$_6$H$_4$—C$_6$H$_4$—(CH$_2$)$_o$—, —(CH$_2$O)$_p$, (CH$_2$CH$_2$O)$_o$, —(CH$_2$)$_o$—O$_x$—C$_6$H$_4$—SO$_2$—C$_6$H$_4$—O$_x$—(CH$_2$)$_o$—, where x is 0 or 1, and Ph, o and p have the definition given above.

R$^4$ radical is preferably a monovalent SiC-bonded, optionally substituted hydrocarbyl radical which is free of aliphatic carbon-carbon multiple bonds and has 1 to 18 carbon atoms, more preferably a monovalent SiC-bonded, hydrocarbyl radical which is free of aliphatic carbon-carbon multiple bonds and has 1 to 6 carbon atoms, especially the methyl or phenyl radical.

R$^5$ radical from formula (I) may comprise any groups amenable to an addition reaction (hydrosilylation) with an SiH-functional compound.

If R$^5$ radical comprises SiC-bonded, substituted hydrocarbyl radicals, preferred substituents are halogen atoms, cyano radicals and –OR$^6$ where R$^6$ has the definition given above.

R$^5$ radical preferably comprises alkenyl and alkynyl groups having 2 to 16 carbon atoms, such as vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, particular preference being given to using vinyl, allyl and hexenyl radicals.

The molecular weight of constituent (A) may vary within wide limits, for instance between 10$^2$ and 10$^6$ g/mol. For example, constituent (A) may be an alkenyl-functional oligosiloxane of relatively low molecular weight, such as 1,2-divinyltetramethyldisiloxane, but also a high-polymeric polydimethylsiloxane having Si-bonded vinyl groups in chain or terminal positions, for example having a molecular weight of 10$^5$ g/mol (number average determined by means of NMR). Nor is the structure of the molecules that form constituent (A) fixed; more particularly, the structure of a higher-molecular, i.e. oligomeric or polymeric, siloxane may be linear, cyclic, branched or else resinous and network-like. Linear and cyclic polysiloxanes are preferably composed of units of the formula R$^4{}_3$SiO$_{1/2}$, R$^5$R$^4{}_2$SiO$_{1/2}$, R$^5$R$^4$SiO$_{1/2}$ and R$^4{}_2$SiO$_{2/2}$, where R$^4$ and R$^5$ have the definition given above. Branched and network-like polysiloxanes additionally contain trifunctional and/or tetrafunctional units, preference being given to those of the formulae R$^4$SiO$_{3/2}$, R$^5$SiO$_{3/2}$ and SiO$_{4/2}$. It is of course also possible to use mixtures of different siloxanes that meet the criteria of constituent (A).

Particularly preferred as component (A) is the use of vinyl-functional, essentially linear polydiorganosiloxanes having a viscosity of 0.01 to 500 000 Pa·s, more preferably of 0.1 to 100 000 Pa·s, in each case at 25° C., measured to DIN EN ISO 3219:1994 and DIN 53019 by means of a calibrated rheometer with a cone-plate system, CP50-2 cone with an opening angle of 2° and a shear rate of 1 s$^{-1}$.

Organosilicon compounds (B) used may be any hydrogen-functional organosilicon compounds that have also been used to date in addition-crosslinkable compositions.

Organopolysiloxanes (B) having Si-bonded atoms that are used are preferably linear, cyclic or branched organopolysiloxanes composed of units of the general formula (III)

where
R$^4$ has the definition given above,
c is 0.1 2 or 3 and
d is 0, 1 or 2,
with the proviso that the sum total of c+d is not more than 3 and there are at least two Si-bonded hydrogen atoms per molecule.

The organopolysiloxane (B) used preferably contains Si-bonded hydrogen in the range from 0.04 to 1.7 percent by weight, based on the total weight of the organopolysiloxane (B).

The molecular weight of constituent (B) may likewise vary within wide limits, for instance between 10$^2$ and 10$^6$ g/mol. For example, constituent (B) may be an SiH-functional oligosiloxane of relatively low molecular weight, such as tetramethyldisiloxane, but also a high-polymeric polydimethylsiloxane having SiH groups in chain or terminal positions or a silicone resin having SiH groups.

Nor is the structure of the molecules that form constituent (B) fixed; more particularly, the structure of a higher-molecular, i.e. oligomeric or polymeric, SiH-containing siloxane may be linear, cyclic, branched or else resinous and network-like. Linear and cyclic polysiloxanes (B) are preferably composed of units of the formula R$^4{}_3$SiO$_{1/2}$, HR$^4{}_2$SiO$_{1/2}$, HR$^4$SiO$_{2/2}$ and R$^4{}_2$SiO$_{2/2}$, where R$^4$ has the definition given above. Branched and network-like polysiloxanes additionally contain trifunctional and/or tetrafunctional units, preference being given to those of the formulae R$^4$SiO$_{3/2}$, HSiO$_{3/2}$ and SiO$_{4/2}$, where R$^4$ has the definition given above.

It is of course also possible to use mixtures of different siloxanes that meet the criteria of constituent (B). In particular, the molecules that form constituent (B), in addition to the obligatory SiH groups, may optionally at the same time also contain aliphatically unsaturated groups. Particular preference is given to the use of SiH-functional compounds of low molecular weight, such as tetrakis(dimethylsiloxy)silane and tetramethylcyclotetrasiloxane, and also SiH-containing siloxanes of higher molecular weight, such as poly(hydromethyl)siloxane and poly(dimethylhydromethyl)siloxane having a viscosity at 25° C. of 10 to 20 000 mPa·s, measured to DIN EN ISO 3219: 1994 and DIN 53019 by means of a calibrated rheometer with a cone-plate system, CP50-2 cone with an opening angle of 2° and a shear rate of 1 s$^{-1}$, or analogous SiH-containing compounds in which some of the methyl groups have been replaced by 3,3,3-trifluoropropyl or phenyl groups.

Constituent (B) is preferably present in the crosslinkable silicone compositions in such an amount that the molar ratio of SiH groups to aliphatically unsaturated groups from (A) is 0.1 to 20, more preferably between 0.3 and 2.0.

Components (A) and (B) used are commercial products or are producible by standard methods.

Rather than components (A) and (B), the silicone compositions may contain organopolysiloxanes (C) which simultaneously contain aliphatic carbon-carbon multiple bonds and Si-bonded hydrogen atoms. It is also possible for the silicone compositions to contain all three components (A), (B) and (C).

If siloxanes (C) are used, they are preferably those composed of units of the general formula (IV), (V) and (VI)

   (IV)

   (V)

   (VI)

where
$R^4$ and $R^5$ have the definition given above,
f=0, 1, 2 or 3,
g=0, 1 or 2 and
h=0, 1 or 2,
with the proviso that there are at least two $R^5$ radicals and at least two Si-bonded hydrogen atoms per molecule.

Examples of organopolysiloxanes (C) are those composed of $SO_{4/2}$, $R^4_3SiO_{1/2}$, $R^4_2R^5SiO_{1/2}$ and $R^4_2HSiO_{1/2}$ units, called MP resins, where these resins may additionally contain $R^4SiO_{3/2}$ and $R^4_2SiO$ units, and also linear organopolysiloxanes consisting essentially of $R^4_2R^5SiO_{1/2}$, $R^4_2SiO$ and $R^4HSiO$ units with $R^4$ and $R^5$ as defined above.

The organopolysiloxanes (C) preferably have an average viscosity of 0.01 to 500 000 Pa·s, more preferably 0.1 to 100 000 Pa·s, in each case at 25° C., measured to DIN EN ISO 3219: 1994 and DIN 53019 by means of a calibrated rheometer with a cone-plate system, CP50-2 cone with an opening angle of 2° and a shear rate of 1 s$^{-1}$.

Organopolysiloxanes (C) are commercially available or are producible by standard methods.

Addition-crosslinking silicone compositions may be selected from the group comprising
in each case at least one compound (A), (B) and (D),
in each case at least one compound (C) and (D), and
in each case at least one compound (A), (B), (C) and (D),
where
(A) is an organic compound or an organosilicon compound containing at least two radicals having aliphatic carbon-carbon multiple bonds,
(B) is an organosilicon compound containing at least two Si-bonded hydrogen atoms,
(C) is an organosilicon compound containing Si—C-bonded radicals with aliphatic carbon-carbon multiple bonds and Si-bonded hydrogen atoms, and
(D) is a hydrosilylation catalyst.

The silicone composition typically contains 30-95% by weight, preferably 30-80% by weight and more preferably 40-70% by weight of (A), based on the total mass of the silicone composition.

The silicone composition typically contains 0.1-60% by weight, preferably 0.5-50% by weight and more preferably 1-30% by weight of (B), based on the total mass of the silicone composition.

If the silicone composition contains component (C), there is typically 30-95% by weight, preferably 30-80% by weight, more preferably 40-70% by weight, of (C) present in the formulation, based on the total mass of the silicone composition.

The amount of component (D) may be between 0.1 and 1000 parts per million (ppm), 0.5 and 100 ppm or 1 and 25 ppm of the platinum group metal, depending on the total weight of the components.

The amounts of all the components present in the silicone composition are chosen here such that the total thereof does not exceed 100% by weight, based on the total mass of the silicone composition.

The hydrosilylation catalyst (D) used may be any of the catalysts known in the art. Component (D) may be a platinum group metal, for example platinum, rhodium, ruthenium, palladium, osmium or iridium, an organometallic compound or a combination thereof. Examples of component (D) are compounds such as hexachloroplatinum (IV) acid, platinum dichloride, platinum acetylacetonate and complexes of said compounds encapsulated in a matrix or a core-shell structure. The platinum complexes with a low molecular weight of the organopolysiloxanes include 1,3-diethenyl-1,1,3,3-tetramethyldisiloxane complexes with platinum. Further examples are platinum phosphite complexes, platinum phosphine complexes or alkyl platinum complexes. These compounds may be encapsulated in a resin matrix.

The concentration of component (D) is sufficient to catalyze the hydrosilylation reaction of components (A) and (B) on contact, in order to generate the heat required in the method described. The amount of component (D) may be between 0.1 and 1000 parts per million (ppm), 0.5 and 100 ppm or 1 and 25 ppm of the platinum group metal, according to the total weight of the components. The curing rate may be low when the constituent of the platinum group metal is below 1 ppm. The use of more than 100 ppm of the platinum group metal is uneconomic or can reduce the stability of the adhesive formulation.

The silicone composition preferably contains platinum complexes of the general formula (VII)

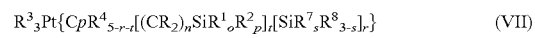   (VII)

where, in formula (VII),
Cp means cyclopentadienyl radical,
n is an integer from 1 to 8,
o is 0, 1, 2 or 3,
p is 0, 1, 2 or 3, with the proviso that o+p=3,
r is 1, 2, 3, 4 or 5, preferably 1, 2 or 3, more preferably 1 or 2, especially 1,
t is 0, 1, 2, 3 or 4, preferably 0 or 1, more preferably 1, with the proviso that r+t≤5, preferably 3,
s is 0, 1 or 2, preferably 2,
R may be the same or different and is a hydrogen atom or a monovalent unsubstituted or substituted hydrocarbyl radical,
$R^1$ may be the same or different and is a monovalent unsubstituted or substituted hydrocarbyl radical that may be interrupted by heteroatoms,
$R^2$ may be the same or different and is a hydrolyzable group or an oxygen-bonded siloxy radical,
$R^7$ may the same or different and is a monovalent unsubstituted or substituted, aliphatically saturated hydrocarbyl radical that may be interrupted by heteroatoms, or an oxygen-bonded siloxy radical,
$R^8$ may be the same or different and represents an aliphatically unsaturated, optionally substituted radical,
$R^3$ may be the same or different and is a monovalent unsubstituted or substituted, aliphatically saturated hydrocarbyl radical,
$R^4$ may be the same or different and is a hydrogen atom, SiC-bonded silyl radical or an unsubstituted or substituted hydrocarbyl radical that may be interrupted by heteroatoms.

Examples of such platinum complexes of the formula (VII) are trimethyl[(allyldimethylsilyl)cyclopentadienyl]platinum (IV),
trimethyl[((2-methylallyl)dimethylsilyl)cyclopentadienyl]platinum(IV),
trimethyl[(trimethoxysilyl)methyl(allyldimethylsilyl)cyclopentadienyl]platinum(IV),
trimethyl[(2-trimethoxysilyl)ethyl(allyldimethylsilyl)cyclopentadienyl]platinum(IV),
trimethyl[(3-trimethoxysilyl)propyl(allyldimethylsilyl)cyclopentadienyl]platinum(IV),
trimethyl[(3-dimethoxymethylsilyl)propyl(allyldimethylsilyl)cyclopentadienyl]-platinum(IV),
trimethyl[(4-trimethoxysilyl)butyl-(allyldimethylsilyl)cyclopentadienyl]platinum(IV),
trimethyl[(2-trimethoxysilyl)-1-methylethyl(allyldimethylsilyl)cyclopentadienyl]-platinum(IV),
trimethyl[(3-trimethoxysilyl)-2-methyl-2-propyl(allyldimethylsilyl)cyclopentadienyl]-platinum(IV),
trimethyl[bis(allyldimethylsilyl)cyclopentadienyl]platinum (IV),
trimethyl[bis(2-methylallyldimethylsilyl)cyclopentadienyl]platinum(IV),
trimethyl[(trimethoxysilyl)methylbis(allyldimethylsilyl)cyclopentadienyl]platinum(IV),
trimethyl[(2-trimethoxysilyl)ethylbis(allyldimethylsilyl)cyclopentadienyl]platinum(IV),
trimethyl[(3-trimethoxysilyl)propylbis(allyldimethylsilyl)cyclopentadienyl]platinum(IV),
trimethyl[(4-trimethoxysilyl)butylbis(allyldimethylsilyl)cyclopentadienyl]platinum(IV),
trimethyl[(2-trimethoxysilyl)-1-methyl-ethylbis(allyldimethylsilyl)cyclopentadienyl]-platinum(IV),
trimethyl[(3-trimethoxysilyl)-2-methyl-2-propylbis(allyldimethylsilyl)cyclopentadienyl]-platinum(IV),
trimethyl[tris(allyldimethylsilyl)cyclopentadienyl]platinum (IV),
trimethyl[(triethoxysilyl)methyl(allyldimethylsilyl)cyclopentadienyl]platinum(IV),
trimethyl[(triacetoxysilyl)methyl(allyldimethylsilyl)cyclopentadienyl]platinum(IV),
trimethyl[(3-bistrimethylsiloxy)methylsilylpropyl](allyldimethylsilyl)cyclopentadienyl-platinum(IV),
trimethyl[(3-triethoxysilyl)propyl(allyldimethylsilyl)cyclopentadienyl]platinum(IV),
trimethyl[(triethoxysilyl)methylbis(allyldimethylsilyl)cyclopentadienyl]platinum(IV),
trimethyl[(3-triethoxysilyl)propylbis(allyldimethylsilyl)cyclopentadienyl]platinum(IV),
trimethyl[(triethoxysilyl)methyltris(allyldimethylsilyl)cyclopentadienyl]platinum(IV),
triethyl[(allyldimethylsilyl)cyclopentadienyl]platinum(IV),
tris(trimethylsilylmethyl)[(allyldimethylsilyl)cyclopentadienyl]platinum(IV),
triethyl[(trimethoxysilyl)methyl(allyldimethylsilyl)cyclopentadienyl]platinum(IV),
triethyl[(trimethoxysilyl)methylbis(allyldimethylsilyl)cyclopentadienyl]platinum(IV),
triethyl[tris(allyldimethylsilyl)cyclopentadienyl]platinum (IV) and triethyl[(trimethoxysilyl)methyltris(allyldimethylsilyl)cyclopentadienyl]platinum(IV).

These platinum complexes are described, for example, in WO2016030325 A1.

In a further embodiment, the silicone compositions are peroxidically crosslinkable silicone materials. These silicone materials may be organically crosslinked by the addition of organic peroxide (as component D). In that case, the silicone composition consists at least of components (A) and (D). In this case, there is preferably between 0.1% and 20% by weight of component (D) in the silicone rubber compounds. Crosslinkers used in component (D) may be any of the corresponding and typical peroxides that are known in the art. Examples of component (D) are dialkyl peroxides, such as 2,5-dimethyl-2,5-di(tert-butylperoxy)hexane, 1,1-di(tert-butylperoxy)cyclohexane, 1,1-di(tert-butylperoxy)-3,3,5-trimethylcyclohexane, a-hydroxyperoxy-a'-hydroxydicyclohexyl peroxide, 3,6-dicyclohexylidene-1,2,4,5-tetroxane, di-tert-butyl peroxide, tert-butyl tert-triptyl peroxide and tert-butyltriethyl 5-methylperoxide, diaralkyl peroxides, such as dicumyl peroxide, alkyl aralkyl peroxides, such as tert-butyl cumyl peroxide and a,a'-di(tert-butylperoxy)-m/p-diisopropylbenzene, alkyl acylperoxides, such as t-butyl perbenzoate, and diacyl peroxides, such as dibenzoyl peroxide, bis(2-methylbenzoyl peroxide), bis(4-methylbenzoyl peroxide) and bis(2,4-dichlorobenzoyl peroxide). Preference is given to use of vinyl-specific peroxides, the most important representatives of which are the dialkyl and diaralkyl peroxides.

Particular preference is given to the use of 2,5-dimethyl-2,5-di(tert-butylperoxy)-hexane and dicumyl peroxide. It is possible to use individual peroxides or mixtures of different peroxides. The content of the peroxidically crosslinkable silicone rubber compound in constituent (D) is preferably between 0.1% and 5.0% by weight, more preferably between 0.5% and 1.5% by weight. Preference is thus given to the crosslinkable silicone rubber compounds, characterized in that the crosslinker (D) is present at 0.1% to 5.0% by weight and is an organic peroxide or a mixture of organic peroxides, based in each case on the total mass of the silicone composition.

The compositions described may optionally contain all the further additives that have also been used to date for production of peroxide- and addition-crosslinkable compositions.

These additives may also have been added to any of the condensation-crosslinking silicone elastomer compositions known in the art. A more detailed description of this mode of crosslinking is described, for example, in EP0787766 A1.

The examples of optional components include (E) fillers.

Examples of reinforcing fillers that can be used as a component in the silicone compositions are fumed or precipitated silicas having BET surface areas of at least 50 $m^2/g$, and also carbon blacks and activated carbons such as furnace black and acetylene black, preference being given to fumed and precipitated silicas having BET surface areas of at least 50 $m^2/g$. The silica fillers mentioned may have hydrophilic character or be hydrophobized by known methods. The content of actively reinforcing filler in the crosslinkable composition is in the range from 0% to 70% by weight, preferably 0% to 50% by weight, based on the total mass of the silicone composition.

More preferably, the crosslinkable silicone rubber compounds are characterized in that filler (E) has been surface-treated. The surface treatment is achieved by methods of hydrophobizing finely divided fillers that are known in the prior art. The hydrophobization can be effected, for example, either prior to incorporation into the polyorganosiloxane or else in the presence of a polyorganosiloxane by the in situ method. Both methods may be conducted either in the batch process or continuously. Hydrophobizing agents used with preference are organosilicon compounds that are capable of reacting with the filler surface to form covalent bonds or are permanently physisorbed on the filler surface. Examples of hydrophobizing agents are alkylchlorosilanes, such as methyltrichlorosilane, dimethyldichlorosilane, trimethylchlorosilane, octyltrichlorosilane, octadecyltrichlorosilane, octylmethyldichlorosilane, octadecylmethyldichlorosilane, octyldimethylchlorosilane, octadecyldimethylchlorosilane and tert-butyldimethylchlorosilane; alkylalkoxysilanes, such as dimethyldimethoxysilane, dimethyldiethoxysilane, trimethylmethoxysilane and trimethylethoxysilane; trimethylsilanol; cyclic diorgano(poly)siloxanes, such as octamethylcyclotetrasiloxane, decamethylcyclopentasiloxane; linear diorganopolysiloxanes, such as dimethylpolysiloxanes having trimethylsiloxy end groups, and dimethylpolysiloxanes having silanol or alkoxy end groups; disilazanes, such as hexaalkyldisilazanes, especially hexamethyldisilazane, divinyltetramethyldisilazane, bis(trifluoropropyl)tetramethyldisilazane; cyclic dimethylsilazanes, such as hexamethylcyclotrisilazane. It is also possible to use mixtures of the hydrophobization agents specified further up. In order to accelerate hydrophobization, another option is to add catalytically active additives, for example amines, metal hydroxides and water.

Hydrophobization can be effected, for example, in one step using one hydrophobizing agent or a mixture of two or more hydrophobizing agents, but also using one or more hydrophobizing agents in multiple steps.

Preferred fillers (E), as a result of a surface treatment, have a carbon content of at least 0.01% to not more than 20% by weight, preferably between 0.10% and 10% by weight, more preferably between 0.5% to 5% by weight, based on the total mass of the silicone composition. Particular preference is given to crosslinkable silicone rubber compounds that are characterized in that the filler (E) is a surface-treated silica having 0.01% to 2% by weight of Si-bonded, aliphatically unsaturated groups, based on the total mass of the filler. For example, these are Si-bonded vinyl groups. In the silicone rubber compound, constituent (E) is preferably used as a single finely divided filler, or likewise preferably as a mixture of multiple finely divided fillers.

The silicone composition may optionally contain, as constituents, further additions in a proportion of up to 70% by weight, preferably 0.0001% to 40% by weight, based on the total mass of the silicone composition. These additions may, for example, be inactive fillers, resinous polyorganosiloxanes other than siloxanes (A), (B) and (C), reinforcing and non-reinforcing fillers, fungicides, fragrances, rheological additives, corrosion inhibitors, oxidation inhibitors, light stabilizers, flame retardants and agents for influencing electrical properties, dispersing aids, solvents, adhesion promoters, pigments, dyes, plasticizers, organic polymers, heat stabilizers etc. These include additions such as ground quartz, diatomaceous earth, clay, chalk, lithopone, carbon blacks, graphite, graphene, metal oxides, metal carbonates, metal sulfates, metal salts of carboxylic acids, metal dusts, fibers, nanofibers, such as glass fibers, polymer fibers, polymer powders, metal dusts, dyes, and pigments.

These fillers may additionally be thermally conductive or electrically conductive. Electrically conductive fillers may be used, for example, in order to produce electrically conductive silicone layers, which can in turn serve as electrode layer in sensors, actuators or other EAP systems. Examples of thermally conductive fillers are aluminum nitride; aluminum oxide; barium titanate; beryllium oxide; boron nitride; diamond; graphite; magnesium oxide; particulate metal, for example copper, gold, nickel or silver; silicon carbide; tungsten carbide; zinc oxide and/or a combination thereof. Thermally conductive fillers are known in the prior art and are commercially available. For example, CB-A20S and A1-43-Me are alumina fillers in different particle sizes that are commercially available from Showa-Denko, and AA-04, AA-2 and AA1 8 are alumina fillers that are commercially available from Sumitomo Chemical Company. Silver fillers are commercially available from Metalor Technologies U.S.A. Corp. of Attleboro, Massachusetts, U.S.A. Boron nitride fillers are commercially available from Advanced Ceramics Corporation, Cleveland, Ohio, U.S.A.

The reinforcing fillers include silica and short fibers, for example short Kevlar® fibers. It is possible to use a combination of fillers having different particle sizes and different particle size distribution.

The silicone composition may also contain one or more optional components. The examples of optional components include (F) one or more solvents and (G) one or more inhibitors.

The silicone composition may additionally optionally contain (F) one or more solvents. However, it should be ensured that the solvent does not have any adverse effects on the overall system. Suitable solvents are known in the art and are commercially available. The solvent may, for example, be an organic solvent having 3 to 20 carbon atoms. Examples of solvents include aliphatic hydrocarbons, for example nonane, decalin and dodecane; aromatic hydrocarbons, for example mesitylene, xylene and toluene; esters, for example ethyl acetate and butyrolactone; ethers, for example n-butyl ether and polyethylene glycol monomethyl ester; ketones, for example methyl isobutyl ketone and methyl pentyl ketone; silicone fluid, for example linear, branched and cyclic polydimethylsiloxanes, and combinations of these solvents. The optimal concentration of a particular solvent in an adhesive formulation can be easily determined by routine tests. Depending on the weight of the compound, the amount of solvent may be between 0% and 95% by weight or between 1% and 95% by weight, based on the total weight of the silicone composition.

Inhibitors (G) and stabilizers serve to control the processing time, initiation temperature and crosslinking rate of the silicone compositions in a targeted manner. These inhibitors and stabilizers are very well known in the field of addition-crosslinking compositions. Examples of commonly used inhibitors are acetylenic alcohols, such as 1-ethynyl-1-cyclohexanol, 2-methyl-3-butyn-2-ol and 3,5-dimethyl-1-hexyn-3-ol, 3-methyl-1-dodecyn-3-ol, polymethylvinylcyclosiloxanes such as 1,3,5,7-tetravinyltetramethyltetracyclosiloxane, low molecular weight silicone oils having methylvinyl-$SiO_{1/2}$ groups and/or $R_2$vinyl$SiO_{1/2}$ end groups, such as divinyltetramethyldisiloxane, tetravinyldimethyldisiloxane, trialkyl cyanurates, alkyl maleates, such as diallyl maleates, dimethyl maleate and diethyl maleate, alkyl fumarates, such as diallyl fumarate and diethyl fumarate, organic hydroperoxides such as cumene hydroperoxide, tert-butyl hydroperoxide and pinane hydroperoxide, organic peroxides, organic sulfur oxides, organic amines, diamines and amides, phosphines and phosphites, nitriles, triazoles, diaziridines and oximes. The effect of these added inhibitors (E) depends on their chemical structure, and so the concentration has to be determined individually. Inhibitors and inhibitor mixtures are preferably added in a proportion of 0.000010% to 5% based on the total weight of the mixture, preferably 0.00005% to 2% and more preferably 0.0001% to 1%.

After all components of the silicone composition have been mixed, dynamic viscosity at a shear rate of 1 $s^{-1}$ is between 10 mPa·s and 1000 Pa·s, preferably between 100 mPa·s and 100 Pa·s and more preferably between 200 mPa·s and 50 Pa·s, measured to DIN EN ISO 3219: 1994 and DIN 53019 by means of a calibrated rheometer with a cone-plate system, CP50-2 cone with an opening angle of 2° at 25° C. and a shear rate of 1 s$^{-1}$.

An example of a suitable measuring instrument is the MCR302 rheometer, obtainable from Anton Paar GmbH, Austria (gap width 105 μm).

The crosslinkable silicone compositions have the advantage that they can be produced in a simple method using readily obtainable starting materials and hence in an economically viable manner. The crosslinkable compositions have the further advantage that they have good storage stability as a one-component formulation at 25° C. and ambient pressure, and crosslink rapidly only at elevated temperature. The silicone compositions have the advantage that, in the case of a two-component formulation, after the two components have been mixed, they result in a crosslinkable silicone composition which remains processable over a long period of time at 25° C. and ambient pressure, i.e. show an extremely long pot life, and crosslinks rapidly only at elevated temperature.

Examples of silicone compositions available on the market are (depending on the viscosity of the materials, solvent may be added for better processability):

Materials from WACKER Chemie AG: ELASTOSIL® P series (7010, 7600, 7613, 7161-160, 7616-195, 7618, 7619, 7622, 7623, 7624, 7628, 7629, 7630, 7633, 7636, 7642-220, 7670, 671, 7676, 7682, 7683/15, 7683/25, 7683/47, 7683/50, 7683/55, 7684/60, 7685, 7686, 7687, 7688, 7700, 7710, 7720, 7731, 7742, 7770, 7707 US, 7915, etc.), ELASTOSIL® M series (4115, 4125, 4370, 4400, 4440, 4441, 4470, 4600, 4601, 4615, 4630, 4635, 4640, 4645, 4641, 4643, 4644, 4670, 4647, 4648, 4670), ELASTOSIL® RT series (601, 602, 604, 607, 615, 617, 619, 620, 622, 623, 624, 625, 626, 627, 628, 629, 630, 633, 646, 670, 672, 675, 678, 685, etc.), ELASTOSIL® SOLAR series (2000, 2200, 2202, 3210, etc.), ELASTOSIL® LR series (3003/03, 3003/05, 3003/10, 3003/20, 3070/20, 3844/20, 3846/20, 3856/20, 3003/30, 3004/30, 3005/30, 3040/30, 3044/30, 3065/30, 3070/30, 3071/30, 3072/30, 3843/30, 3844/30, 3846/30, 3856/30, 3003/40, 3003/50, 3003/60, 3003/70, 3003/80, 3003/85, 3004/40, 3004/50, 3004/60, 3004/70, 3005/40, 3005/50, 3005/60, 3040/40, 3040/50, 3040/60, 3043/40, 3043/50, 3043/60, 3043/70, 3015/70, 3023/60, 3092/65, 3094/60, 3065/50, 3066/40, 3066/60, 3066/80, 3070/40, 3070/50, 3070/60, 3071/40, 3071/50, 3071/60, 3072/40, 3074/60, 3076/70, 3170/40, 3841/50, 3842/40, 3842/50, 3842/60, 3842/70, 3162, etc.), ELASTOSIL® FLR series (3900/40, 3900/60, 3905/40, 3905/60, etc.), ELASTOSIL® R series, WACKER SILGEL® series (610, 611, 612, 613, 616, 619, etc.), SEMICOSIL® series, POWERSIL® series, LUMISIL® series, GENIOMER® series, SILPURAN® series, DEHESIVE® series.

Also usable in addition to the abovementioned crosslinkable silicone compositions for the application of additional layers are non-curing silicone compositions, for example silicone oils. In this context, the following products from WACKER Chemie AG, Germany, are usable WACKER® AK SILICONOEL series, POWERSIL® FLUID TR series, SILFAR® series.

In general, silicone-based PSAs (pressure-sensitive adhesives) are usable.

Even in the case of different applications, use of non-curing print materials as support material or separating layer is advantageous. These compositions can be removed subsequently without residue from the or out of the print body by rinsing and/or heating. An example of a suitable print material here is polyethylene glycol (PEG). Suitable support materials composed of polyethers are described, for example, in WO2017020971 A1 and WO2018036640 A1.

Alternative support materials here too may be waxes, beeswax, vaseline, paraffins, resins, gelatins and generally any thermally meltable mass. Particular preference is given here to the use of polyethylene glycol (PEG) or wax. Suitable support material made of wax is described, for example, in WO2018153467 A1.

As mentioned above, the crosslinking mechanisms may be chosen freely and also combined. In this context, WO9300405 A1 and PCT application PCT/EP2020/060378 (as yet unpublished) name various combinations of UV crosslinking and moisture crosslinking. The advantages here are crosslinking of the UV-accessible compositions and postcrosslinking of the shadowed compositions. These positive crosslinking effects may be advantageous for print strategies/print methods with UV-opaque print materials. It is possible here for shadowing to be effected by means of positioned components and/or influence of print materials in or around geometries, and for this to prevent UV crosslinking.

A further form of print materials may be aqueous silicone dispersions.

Preferably, the plate, the continuous belt, the extrinsic component or the previously applied print material layer may be detected by one or more sensor modules prior to step (b).

It is also possible with preference for the printed plate, the printed continuous belt and/or the printed extrinsic component to be detected by one or more sensor modules after step (b) and/or step (c).

The 3D print apparatus therefore comprises one or more inspection units (3, 5) set up to examine the plate (28), the continuous belt (9), the extrinsic component (7), a previously applied print material layer or the printed object.

It is likewise possible for the method of the invention or the apparatus of the invention to make use of the following methods:
- detection or geometric measurement of the print materials during printing, as described, for example, in WO2017108208 A1
- measurement of height by means of a confocal measurement device for determination of the distance between printhead and print surface, as described, for example, in WO2018014948 A1
- determination of the topography of the surface to be printed, and control of the placing of print material dependent thereon, as described, for example, in PCT/EP2019/077812 (as yet unpublished)

On conclusion of the building, the object may optionally be aftertreated, in which case the aftertreatment is selected from one or more of the following methods: heat treatment, irradiation, surface coating, engraving, making of cuts, dividing and removing segments, assembling individual components, cleaning, removal of support material.

The 3D print apparatus therefore comprises at least one aftertreatment unit (4, 6) set up to aftertreat the printed object after printing.

In a preferred embodiment, the 3D print apparatus is a composite production plant system comprising one or more of the units described above and in detail with reference to the figures, for example pick-and-place unit, print unit, curing unit, processing unit, inspection unit, aftertreatment unit, and/or removal unit.

The objects are preferably heat-treated as described, for example, in WO2010015547 A1.

In a particular embodiment, the print materials are applied such that one or more segments are formed in one or more printing planes of the object, each of which consists solely of an object-forming material or support material.

Also possible is the printing of different print materials into one another, in order to obtain a constant mixing ratio with specific properties (for example, a material of ShoreA hardness 20 is mixed with a material of ShoreA hardness 60 in order to obtain a material of ShoreA hardness 40).

The print materials of the object-forming materials may be applied, for example, in such a way that one or more segments are formed within one or more printing planes of the object, each of which consists of a mixture of two or more object-forming materials, and the mixing ratio of the object-forming materials is constant in each segment.

An additional option is also printing of print materials into one another such that gradients are obtained, for example hardness gradients (for example from ShoreA 20 to ShoreA 60), conductivity gradients (for example from electrically conductive to electrically nonconductive) or magnetism gradients (for example from magnetic to non-magnetic).

In addition, it is possible to apply print voxels of the individual print materials such that one or more segments are formed within one or more printing planes of the object, each of which consists of a mixture of two or more object-forming print materials, where the mixing ratio of the object-forming print materials is subject to a gradient in each segment.

A description of such segments and gradients is disclosed, for example, in WO2019063094 A1.

There follows an elucidation in detail of embodiments of the invention with reference to the appended figures.

The scheme of a composite production plant system is depicted in FIG. 1. Blanks/extrinsic components (7) to be printed are precisely positioned on a continuous belt (9) with an automatic pick-and-place unit (8), and introduced into the plant assembly by the continuous belt (9). The continuous belt is withdrawn here from a belt storage means/belt feeder (10) and kept under mechanical tension. After being introduced into the 3D print unit (2), the blank to be printed/the extrinsic component (7) is printed and/or a new individual 3D part is printed.

After this printing process, the parts thus produced are transferred into the inspection unit (3) by the continuous belt (9). Various measurements are undertaken here, and the parts are checked.

After checking by inspection unit (3), the parts are transferred into the aftertreatment unit (4) by conveyor belt (9). Various aftertreatment steps may be undertaken here. Preferably postcrosslinking and heat treatment.

The parts are then transferred into the second inspection unit (5) by conveyor belt (9) and measured again. This is followed by transfer by (9) into a final treatment unit (6).

In final treatment unit (6), all the last physical steps before discharge from the system are effected. In this case, preference is given to undertaking the following steps:
  heat treatment, releasing of the support materials
  cutting of the parts by laser, ultrasonic knife
  engraving, numbering of the printed parts
  rinsing and washing
  surface treatment (plasma treatment)

After all the printed parts (11) and/or the newly created 3D-printed bodies (12) have been discharged, an automatic removal unit (13) is used to remove the parts. At the end of the system, the continuous belt is collected in a belt storage means (18).

All units (8, 2, 3, 4, 5, 6, 13) present in the composite production system (1) are connected to an overall controller/data-processing system (14) via the data interfaces/data connections (15). All process data, print data, measurement data and print geometry etc. are processed in data-processing system (14) in accordance with different linkages and data processes. Database system (16) stores all the relevant process data and measurement data for quality control and product documentation. All data and process parameters are input via the input system (17).

Figure 2:
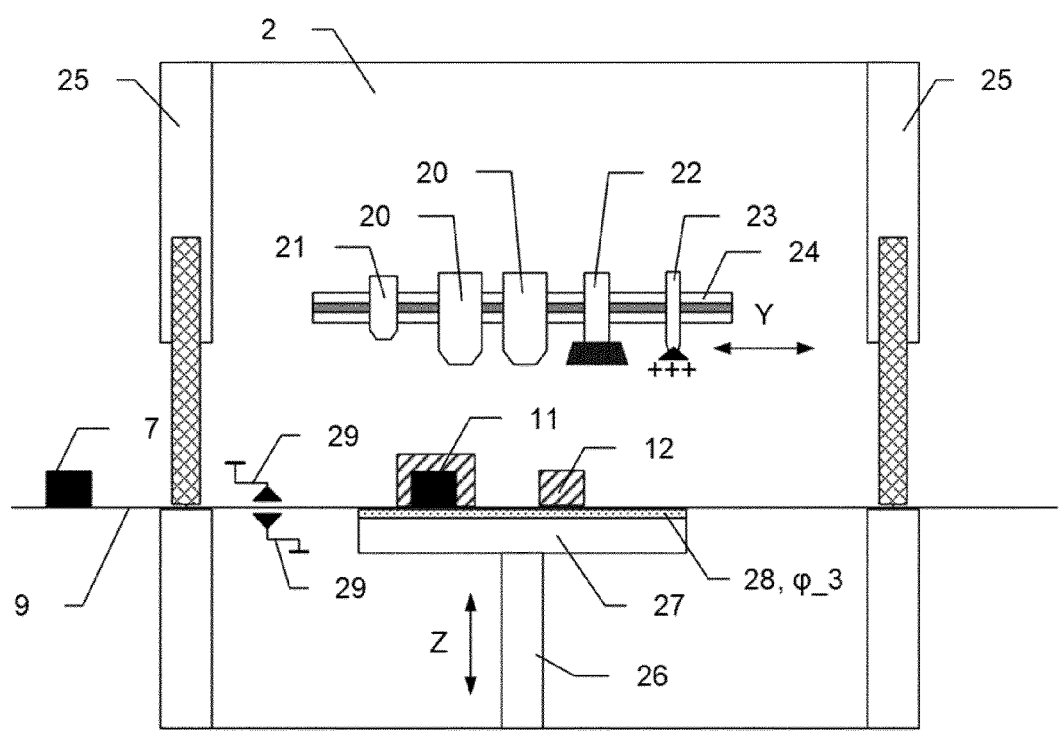
FIG. 2 shows a structural diagram of a 3D printing unit.

FIG. 2 depicts a diagram of a print unit (2). Using a lock (25), the continuous belt (9) with blanks (7) is fed to and removed from the print unit (2). By means of the preliminary discharge module (29), all the parts introduced and the conveyor belt (9) are electrostatically discharged before printing. By means of the print modules (20), print materials and/or support materials are positioned. By means of the curing module (22), crosslinking of the print materials is undertaken. By means of the electrostatic charging/discharging module (23), the positioned materials, blank (body) (7) to be printed, blanks (bodies) (11) printed and 3D-printed individual parts (12) are charged to potential phi_2 in an electrostatically defined manner. Using sensor module (21), geometric and physical data are detected and used for the print process. All modules are moved in Y direction over the stage (27) by the movement axis Y (24). The stage (27) fixes the continuous belt (9) with the vacuum plate (28). The stage (27) is moved precisely in Z direction via the movement axis Z (26), and the respective distance from the target surface (59) to be printed is established. Adjustment accuracies here correspond to the print accuracies and layer thicknesses in the range of less than 1 mm. Preferably less than 0.1 mm into the more preferably less than 0.01 mm.

Figure 3:
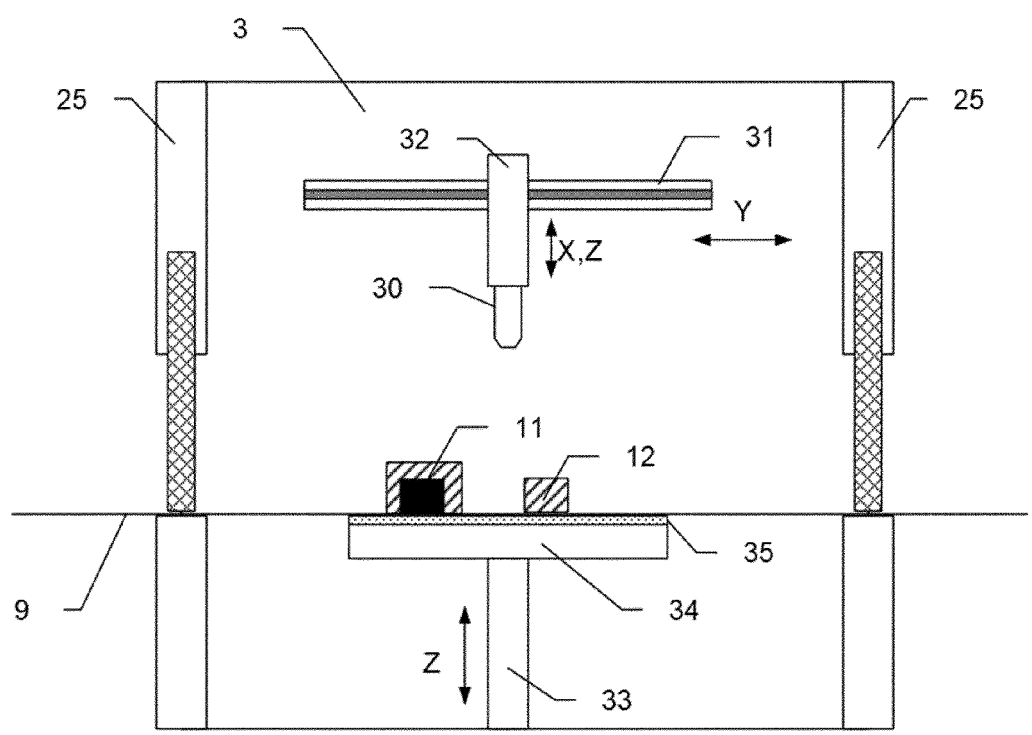
FIG. 3 shows a structural diagram of an inspection unit.

FIG. 3 depicts a diagram of an inspection unit (3). Using a lock (25), the continuous belt (9) with printed blanks (11) and 3D-printed individual parts (12) is fed to and removed from the inspection unit. The printed blanks (11) and the 3D-printed individual parts (12) are measured by means of a sensor module (30). The continuous belt (9) here is again fixed and adjusted positionally and with regard to flatness with a vacuum plate (35) of a contact plate (34) and a movement axis Z (33). For further adjustments of separation and movement in X direction (in the plane of the page), the movement axis X, Z (32) of the sensor module (30) we used. The advantage of use of different Z movement units is the use of axles of different precision and different speeds for different tasks.

The sensor module (30) may be of variable configuration. It may include various optical distance measuring means, laser triangulation sensors, confocal sensors, ultrasound, IR measurement technology, polarization measurement technology, optical spectrometers and/or electromagnetic measurement technology, for example eddy current sensors or coaxial sensors.

Preference is given to determining the following parameters in the inspection unit:
  component measurements (confocal, laser triangulation, ultrasound)
  conductivity (eddy current, electromagnetic measurement)
  curing state (IR spectrometry by through and transmission method)

The two inspection units (3) and (4) are of comparable construction and can determine identical or different properties.

Figure 4:
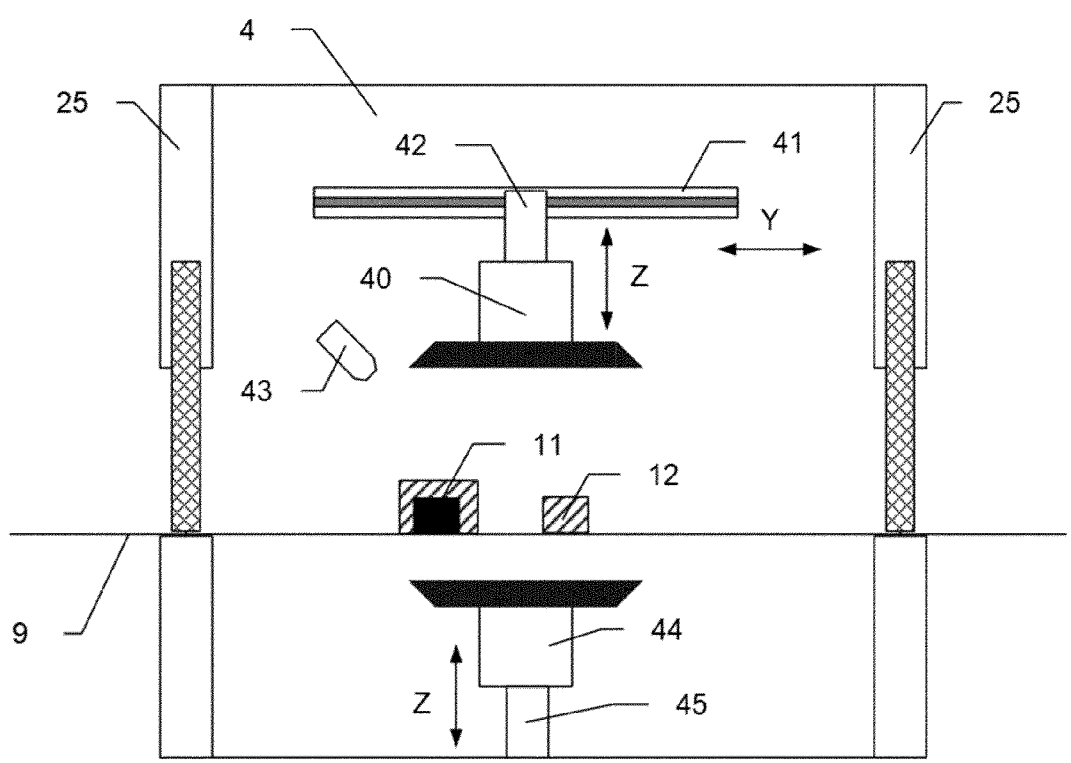
FIG. 4 shows a shows a structural diagram of an after-treatment unit.

FIG. 4 depicts a diagram of an aftertreatment unit (4). Using a lock (25), the continuous belt (9) with printed blanks

(11) and 3D-printed individual parts (12) is fed to and removed from the aftertreatment unit. Using the two curing modules (40) and (44), aftertreatment of the bodies (11) and (12) is undertaken. The positioning of the upper aftertreatment unit (40) is undertaken here by movement axis Y (41) and movement axis Z (42). The positioning of the lower aftertreatment unit (44) is undertaken by movement axis Z (45). By means of a sensor module (43), process parameters, for example surface temperature, are measured contactlessly.

The aftertreatment is effected in order to achieve full crosslinking of the print materials.

The aftertreatment modules may, for example, be equipped here as follows:
  thermally (e.g. IR, hot air, heating elements)
  irradiation (e.g. UV, UV laser, NIR/MIR laser)
  electron beam Treatment times, methods and modules are different depending on the print materials and print material compositions.

FIG. 5 depicts a diagram of a print module (20) in cross section. By means of a laser source (50), a print material layer/electrode material layer (54) is detached here by means of a laser beam (50a) from a radiation-transparent carrier cylinder (51). The detachment is effected in the detachment region (55). The laser beam (50a) induces heating here, which causes evaporation/gas formation/thermal expansion/ of at least one component of the print material/electrode material (54). In the case of standard LIFT processes, the detachment of the print material layer (54) is sufficient to position detached print materials (57) on a target surface (59). By virtue of the counterclockwise rotation of the carrier cylinder (51), a precise layer of print material (54) is applied by the application system (52). After detachment by means of the laser (51), the remaining print materials and detached regions (56) move into the removal system (53), in which all the residual amounts of print material are removed from the carrier cylinder (51). The materials removed here are reprocessed and reused.

In the particular case of the LIFT process with silicone elastomers, improvement of this detachment and positioning can be achieved by additional charging of the print material (54) and of the target surface area (59). This involves charging the print material (54) with the electrical potential ($\varphi\_1$), the target surface with the electrical potential ($\varphi\_2$) and the vacuum plate (28) with the electrical potential ($\varphi\_3$). The polarity of the potentials should be chosen here so as to result in an opposite charge. The charges of the layers at a distance (h) from one another gives rise to electrical fields (E). These in turn exert forces on the print material (54) in the direction of the target surface (59). Thus, detached print material (57) is accelerated by the electrostatic forces and moved in the direction of the target surface (59). The detached print materials (57) are subjected to considerable mechanical shear forces on detachment and on impact. An advantageous material composition (shear-thinning silicones) has an advantageous effect here in the formation of a continuous print material layer. (58). Shear-thinning silicone compositions are described, for example, in WO2017081028A1, WO2017089496 A1 and WO2017121733 A1. Moreover, the electrostatic forces of the remaining charges in the placed print material (58) act in the direction of the vacuum plate (28). It is advantageous for relaxation for there to be a charge on the target surface (59) at the surface with the potential ($\varphi\_2$), to a smaller degree than the charge level of the placed print materials (58). Any remaining charge on the material (58) should be chosen such that any influence on the fields (E) is as small as possible, but relaxation of the print materials (58) is accelerated or improved.

In many executions of the known LIFT method, reference is made to the focusing of the laser beam onto the interface of print material (54) and carrier system (51). In the execution with silicones, the focusing above the carrier results in a better printed image. The focal point (50b) here is in the range from a few micrometers to a few millimeters above the interface of carrier cylinder (51)/print material (54). Focusing of the laser beam onto, within or beneath the interface at first results in detachment (55), but this subsequently leads to considerable further heating on the target surface (59) and hence possibly to combustion or thermal degeneration of the applied print material (58).

The laser beam (50a) is also utilizable in order to heat up the positioned print materials and for point crosslinking. The dosing of the print materials is switched off here, and the carrier cylinder without a print material layer is purely transmissive. By defocusing, the energy introduced is directed onto the printing plane and applied in a controlled manner in defined diameters. As a result, there is no need for a separate curing unit (e.g. IR, oven).

Moreover, controlled introduction of power can achieve not only crosslinking by means of the laser system (50), but likewise melting, fusion, sintering and engraving and cutting of a wide variety of different print materials. Curing and later process steps as described above in unit (6) can thus also be combined in one device.

In a particular execution, print materials/support materials are used together with thermally meltable materials such as waxes or PEG. This involves heating the carrier cylinder (51), the application system (52) and the removal system (53). It is possible here for there to be heating elements within the carrier cylinder (51) and/or to use any heat supply system (e.g. heat carrier oil or hot air).

In a particular embodiment, the carrier cylinder and the built space of the printer may be cooled. The aim of this form is to prevent unwanted crosslinking of the print materials as far as possible.

Figure 6:
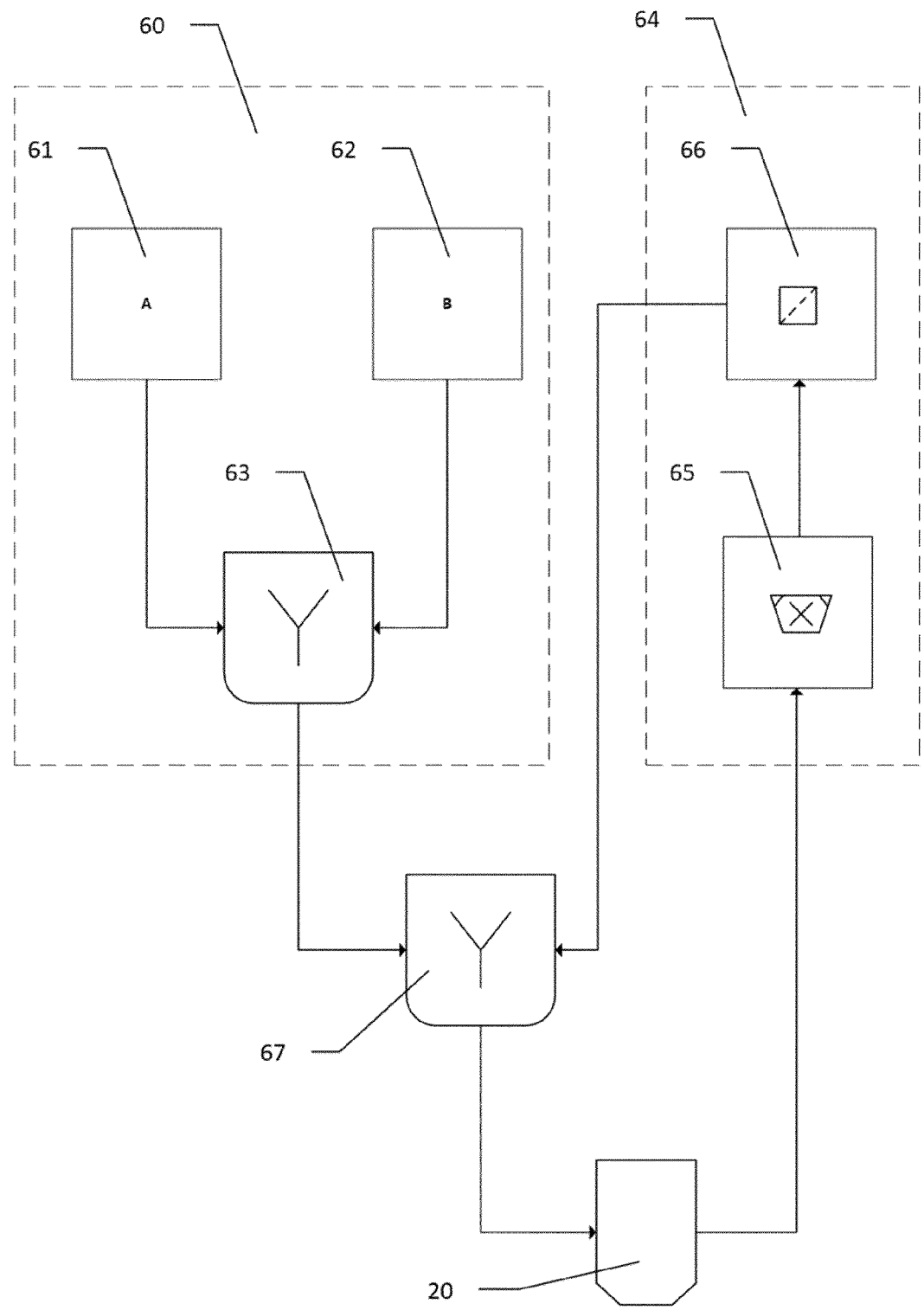
FIG. 6 shows the process procedure for the print material for a LIFT-3D print module.

FIG. 6 depicts a diagram of the material flow of the print material. The provision system (60) supplies the printing system with fresh print material(s). The system (60) consists of two metering units (61) (62) for one two-component print material consisting of A and B components. The mixing system (63) is used to mix the two materials (A, B) and supply them to a further mixing system (67). The mixing system (67) mixes the new print material with reprocessed print material. The print material thus mixed is to the printhead (2), or to the application system (52). In the recyclate processing unit (64), the recycled materials from the removal system (53) are reprocessed. The processing system (64) consists of a mechanical (first) processing system (65) and a second processing system (66). The mechanical processing comprises comminution and filtering. The second processing operation comprises degassing, moistening or demoistening, and optionally addition of further constituents of the print material formulation (e.g. solvent, water, catalyst, crosslinker, etc.)

The advantages of the present invention are summarized once again below:
  Use of variable print materials with different properties (e.g. variable viscosity) and composition in one printing system is enabled.
  A high material throughput of more than 1 kg/h is enabled.

Lower wear, since only few elements that move mechanically at high speed are used (for example, no nozzles are required, as in jetting methods).

Voxel size and layer thickness are variably adjustable via the application system and the laser.

High print quality via stable distance adjustment of the fixedly positioned carrier cylinder (for example no flattening of film carriers).

Use of a small cylinder possible, hence low mechanical tolerances.

The size and construction space of the laser source are not restricted in terms of passage of radiation through the upper free cylinder surface.

Low clear area (low air contact) of the print material on the carrier system.

High precision (possible voxel sizes <100 μm).

The optional use of a continuous belt means that multiple manual operating steps are dispensed with The optional use of electron beams enables rapid crosslinking of print materials without crosslinking catalyst.

The use of the laser (50) for curing/additional use enables new degrees of freedom in the additive manufacturing process. This enables, for example, new curing strategies (point crosslinking can be established), and removal, application, curing in parallel with one device.

The experiments that follow were conducted in order to show comparisons of individual modes of function in principle of the invention. These experiments serve for better understanding of the invention and should not be considered to be limiting with respect to the invention as detailed above and described with reference to the figures.

The LIFT process was conducted with a standard laser gravure system from TROTEC Laser Deutschland GmbH. The system employed here is one from the Speedy 100flexx 60/20 series with a dual laser source (60 W 10.6 um CO2 laser; 20 W 1.06 μm fiber laser). The print material carrier used was standard 300 mm high-resistance and polished silicon wafer from Siltronic AG, Germany. Application of the print material film was accomplished using a ZAA2300 automatic film applicator with a ZUA 2000 universal applicator from Zehntner GmbH, Switzerland. The print material used was ELASTOSIL® RT 625 A/B, an RTV-2 silicone from WACKER Chemie AG, Germany.

Experiment 1: LIFT Method

The doctor blade system was used to apply a homogeneous layer with a thickness of 100 μm and in dimensions of 150×150 mm to the middle of a wafer on one side. The edge regions of the wafer remain clear of print material. An uncoated and cleaned glass pane as surface to be printed was inserted into the cutting space of the laser. The coated wafer is turned to face the uncoated glass pane on the cutting side, and positioned on the glass pane at a distance of 200 μm. The distance is adjusted here by spacers, for example 100 μm microscope plates. The print original chosen in the control software of the laser system is a two-dimensionally filled geometry without gray regions and shading. Moreover, laser power in gravure mode between 20-40% is sufficient in the case of a 60 W laser. Laser speed should be chosen between 30% and 60%. The focal point should be 2 to 3 mm above the interface of the coating or wafer. It was thus possible to transfer the geometries chosen by means of the laser.

Experiment 2: EF LIFT Method

A silicone film (ELASTOSIL® film with thickness 100 μm, available from WACKER Chemie AG) was fixed on a glass pane by a water film. The upper face of the silicone film was then charged to −300 V by a charging system from Simco-Ion, consisting of a high-voltage charging device of the CM LITE series, HDR charging electrode. The measurement of the charge was verified by means of the SK050 electrostatic measuring device, and the SK11000 evaluation unit from Keyence. Comparable charging to +100 V was conducted with the print material layer on the wafer. It should be ensured that there is no unintentional discharging, and that the semiconductor wafers are handled safely after and during the charging of the print material. Subsequently, the two plates are positioned again in the cutting space of the laser. The distance of the print material from the silicone film may be chosen within the range of 100 to 400 μm with spacers. The LIFT operation should be conducted analogously to the description above. Without the charging mentioned, detached print material was to some degree transferred in an incomplete or nonspecific manner. Moreover, the charging achieved more homogeneous deposition and a better bond of the layers transferred.

Experiment 3: Curing by Laser

The silicon wafer was removed and the transferred layer was crosslinked by direct irradiation by laser. Laser power in gravure mode between 10-40% with a 60 W laser is sufficient here. Laser speed should be chosen between 10% and 60%. The focal point should be 1 to 2 mm above the interface of the coating or wafer. Complete crosslinking may require multiple laser passes. It is also possible here to undertake partial crosslinking or adjustment of the degree of crosslinking via the number of passes and laser power.

REFERENCE NUMERALS IN THE FIGURES

FIG. 1: Composite Production Plant System
1. 3D composite production plant
2. 3D print unit
3. Inspection unit
4. Aftertreatment unit
5. Inspection unit
6. Final treatment unit
7. Printable blank (body)
8. Pick-and-place unit
9. Continuous belt
10. Belt storage means/belt feeder
11. Printed blank (body)
12. 3D-printed individual part/3D-printed body
13. Removal unit
14. Overall controller/data processing system
15. Data interfaces/data connections
16. Database system
17. Input system
18. Belt storage medium
19. Unused FIG. 2: 3D Print Unit
20. Print module
21. Sensor module
22. Curing module
23. Electrostatic charging/discharging module
24. Lock
25. Movement axis Y
26. Movement axis Z 27. Stage
28. Vacuum plate
29. Preliminary discharge module
FIG. 3: Inspection Unit
30. Sensor module
31. Movement axis Y
32. Movement axis Z of sensor module
33. Movement axis Z of stage
34. Stage
35. Vacuum plate
36. Unused
37. Unused
38. Unused
39. Unused
FIG. 4: Aftertreatment Unit
40. Upper aftertreatment module
41. Movement axis Y of upper aftertreatment module
42. Movement axis Z of upper aftertreatment module
43. Sensor module
44. Lower aftertreatment module
45. Movement axis Z of lower aftertreatment module
46. Unused
47. Unused
48. Unused
49. Unused
FIG. 5: Print Module
50. Laser source
50a. Laser beam
50b. Focal point of laser beam
51. Carrier cylinder
52. Application system
53. Removal system
54. Print material layer
55. Detachment region of print material
56. Region of detached print material on the carrier cylinder
57. Print voxel/detached print material
58. Positioned print material
59. Surface to be printed
FIG. 6: Process Diagram of Material Flow
60. Print material provision unit
61. Dosage unit for print material for reactant component A
62. Dosage unit for print material for reactant component B
63. Mixing system
64. Recyclate processing unit
65. Mechanical (first) processing system
66. Second processing system
67. Mixer for old and new material
68. Unused
69. Unused

The invention claimed is:

1. A method of layer-by-layer production of objects by laser transfer printing in a 3D print apparatus, comprising:
providing a 3D print apparatus comprising at least one plate, at least one laser source, and at least one carrier cylinder, wherein the material of the at least one carrier cylinder is transparent to at least one laser beam from the at least one laser source, and wherein the laser source is disposed above the at least one carrier cylinder, wherein the method further comprises the steps of:
(a) coating at least part of the outer surface of the at least one carrier cylinder with at least one print material;
(b) irradiating the at least one carrier cylinder with the at least one laser beams from the at least one laser source, such that at least a portion of the applied at least one print material is detached from the at least one carrier cylinder and transferred to the at least one plate, to an extrinsic component positioned thereon or to a previously applied print material layer, wherein the irradiation is effected in such a way that the at least one laser beams hits the at least one print material applied to the lower side of the carrier cylinder directly through both walls of the carrier cylinder from outside the carrier cylinder;
(c) forming a print material layer by curing the at least one print material transferred in step (b); and
(d) repeating steps (a) to (c) until the object has been fully constructed.

2. The method of claim 1, wherein a continuous belt is in a movable arrangement on the at least one plate and wherein in step (b) the at least one print material is detached from the at least one carrier cylinder and transferred to the continuous belt to an extrinsic component positioned thereon or to a previously applied print material layer.

3. The method of claim 1, wherein step (b) is preceded by charging of the at least one print material applied to the at least one carrier cylinder to a potential phi_1, and charging of the at least one plate to a potential phi_3, wherein phi_1 and phi_3 have opposite polarities.

4. The method of claim 3, wherein the surface of the extrinsic component of the previously applied print material layer and/or of the continuous belt is additionally charged to a potential phi_2, wherein phi_2 and phi_1 have opposite polarities and phi_2 is chosen such that at least a portion of the charge on the at least one print material transferred in step (b) is neutralized on the surface to be printed.

5. The method of claim 1, wherein the at least one carrier cylinder rotates and wherein in step (a), an application system applies a layer comprising the at least one print material to the at least one carrier cylinder and the at least one print material that has not been detached after step (b) is removed from the at least one carrier cylinder by a removal system.

6. The method of claim 1, wherein the at least one print materials used are one or more of the following object-forming materials: silicones, polyacrylate, polyolefins, polyurethanes, polyureas, polynitriles, polyesters, polyethers, polylactides, polyhydroxyalkanoates, and mixtures, solutions, dispersions or copolymers comprising one or more of the aforementioned object-forming materials.

7. The method of claim 1, wherein the at least one print material is selected from the group consisting of crosslinkable silicone elastomer compositions, silicone gels, silicone resins, silicone oils and silicone dispersions.

8. The method of claim 1, wherein the at least one print material used additionally includes one or more support materials that are removed after the object has been constructed.

9. The method of claim 1, wherein a focal point of the at least one laser beams is chosen such that it is within the at least one carrier cylinder within a range from 0.01 mm to 10 mm above the interface between the print material and the at least one carrier cylinder.

10. The method of claim 1, wherein the at least one plate is a movable vacuum plate that fixes the continuous belt (9) for step (b) at a particular distance from the coated at least one carrier cylinder.

11. The method of claim 1, wherein the surface to be printed on the at least one plate, the continuous belt, the extrinsic component or the previously applied print material layer is electrostatically discharged by means of a preliminary discharge module before step (b) and before any charging to potential phi_2 or phi_3.

12. The method of claim 1, wherein the material of the at least one carrier cylinder is selected from the group consisting of glass, quartz glass, polyethyleneterephthalate, polycarbonate, polyimide, polymethylmeth-acrylate, ZnSe, ZnS, $BaF_2$, $CaF_2$, Ge, KBr, NaCl, $MgF_2$, LiF and Si.

13. A 3D print apparatus for production of objects by laser transfer printing, comprising:
- at least one laser source;
- at least one carrier cylinder, wherein the material of the at least one carrier cylinder is transparent to at least one laser beams from the at least one laser source;
- at least one application system set up to coat at least part of the outer surface of the at least one carrier cylinder with at least one print material;
- at least one plate;
- wherein the at least one laser source is disposed above the at least one carrier cylinder and is set up to irradiate the at least one carrier cylinder such that at least a portion of the at least one print material applied to the at least one carrier cylinder is detached and transferred to the at least one plate, to an extrinsic component positioned thereon or to a previously applied print material layer; and
- wherein the 3D print apparatus is set up such that the at least one laser beams hit the at least one print material applied to the lower side of the at least one carrier cylinder directly through both walls of the at least one carrier cylinder from outside the at least one carrier cylinder.

14. The 3D print apparatus of claim 13, wherein a continuous belt is in a movable arrangement on the at least one plate (28).

15. The 3D print apparatus of claim 13, wherein the 3D print apparatus further comprises at least one charging/discharging module set up to charge the surface of the at least one print material applied to the at least one carrier cylinder, the surface of the at least one plate and/or the target surface to be printed each independently to a particular potential phi.

16. The 3D print apparatus of claim 13, wherein the 3D print apparatus further comprises at least one curing module set up to cure at least one of the at least one print materials.

17. The 3D print apparatus of claim 13, wherein the 3D print apparatus further comprises at least one removal system set up to remove the at least one print materials that have not been detached from the at least one carrier cylinder.

* * * * *